(12) United States Patent
Kim et al.

(10) Patent No.: US 11,281,086 B2
(45) Date of Patent: Mar. 22, 2022

(54) PROJECTOR

(71) Applicant: LG ELECTRONICS INC., Seoul (KR)

(72) Inventors: Sangkyun Kim, Seoul (KR); Eunbong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/969,932

(22) PCT Filed: May 25, 2018

(86) PCT No.: PCT/KR2018/005982
§ 371 (c)(1),
(2) Date: Aug. 13, 2020

(87) PCT Pub. No.: WO2019/160197
PCT Pub. Date: Aug. 22, 2019

(65) Prior Publication Data
US 2021/0011368 A1 Jan. 14, 2021

(30) Foreign Application Priority Data
Feb. 13, 2018 (KR) .................. 10-2018-0018088

(51) Int. Cl.
*G03B 21/28* (2006.01)
*G03B 21/14* (2006.01)
*H04N 9/31* (2006.01)

(52) U.S. Cl.
CPC ........... *G03B 21/28* (2013.01); *G03B 21/145* (2013.01); *H04N 9/3185* (2013.01)

(58) Field of Classification Search
CPC ...... G03B 21/28; G03B 21/145; G03B 21/14; G03B 21/30; G03B 21/147; H04N 9/3185
USPC ......................................................... 348/789
See application file for complete search history.

(56) References Cited

U.S. PATENT DOCUMENTS

| | | | | |
|---|---|---|---|---|
| 5,033,842 A | * | 7/1991 | Tam .................. | G03B 21/08 353/66 |
| 5,929,910 A | * | 7/1999 | Kim .................. | H04N 7/183 348/373 |
| 6,190,015 B1 | * | 2/2001 | Tsai .................. | G03B 21/006 353/101 |

(Continued)

FOREIGN PATENT DOCUMENTS

| | | |
|---|---|---|
| JP | 2010181442 | 8/2010 |
| KR | 1020070021206 | 2/2007 |
| KR | 1020110097384 | 8/2011 |

OTHER PUBLICATIONS

PCT International Application No. PCT/KR2018/005982, International Search Report dated Nov. 12, 2018, 4 pages.

*Primary Examiner* — John W Miller
*Assistant Examiner* — Sean N. Haiem
(74) *Attorney, Agent, or Firm* — Lee, Hong, Degerman, Kang & Waimey

(57) ABSTRACT

A projector is disclosed. The projector comprises: a body having an upper surfaces; a light output unit provided inside the body and outputting an image toward the upper surface; a cover covering the upper surface and pivotally connected to the body; and a control unit for reversing the image according to the angle formed by the cover and the upper surface.

10 Claims, 34 Drawing Sheets

(56) References Cited

U.S. PATENT DOCUMENTS

| | | | |
|---|---|---|---|
| 6,450,650 B1* | 9/2002 | Tu | G03B 21/10 |
| | | | 353/103 |
| 2004/0036845 A1 | 2/2004 | Hoffmeister et al. | |
| 2004/0114110 A1* | 6/2004 | Shin | G03B 21/28 |
| | | | 353/31 |
| 2006/0098172 A1* | 5/2006 | Goto | G03B 21/28 |
| | | | 353/98 |
| 2006/0250532 A1* | 11/2006 | Shin | H04N 9/3129 |
| | | | 349/6 |
| 2008/0094585 A1* | 4/2008 | Rosendaal | H04N 5/74 |
| | | | 353/98 |
| 2010/0259730 A1 | 10/2010 | Sip et al. | |
| 2013/0120718 A1* | 5/2013 | Chikaoka | G03B 21/2033 |
| | | | 353/85 |
| 2016/0209739 A1* | 7/2016 | Matoba | G03B 21/28 |

* cited by examiner

[FIG. 1]
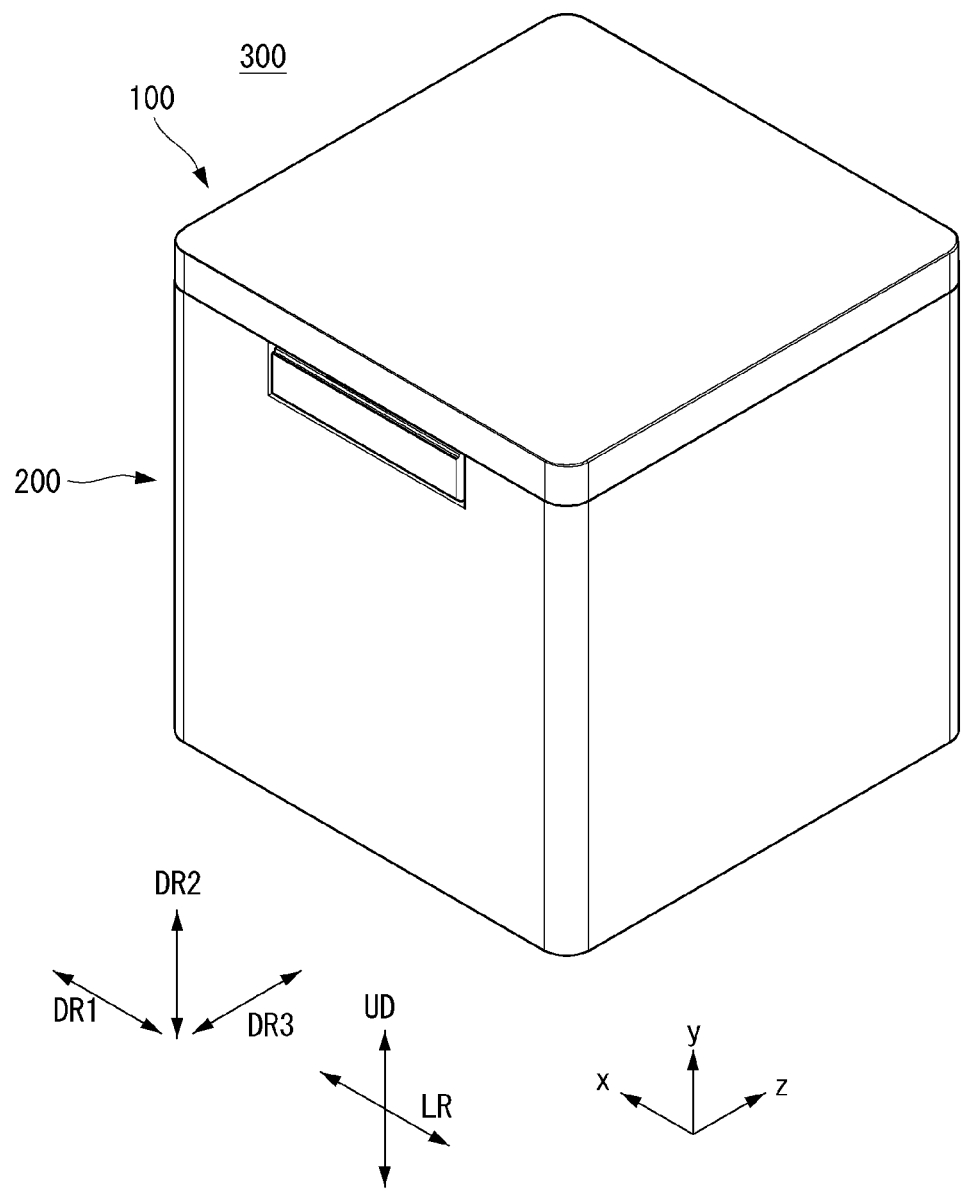

[FIG. 2]
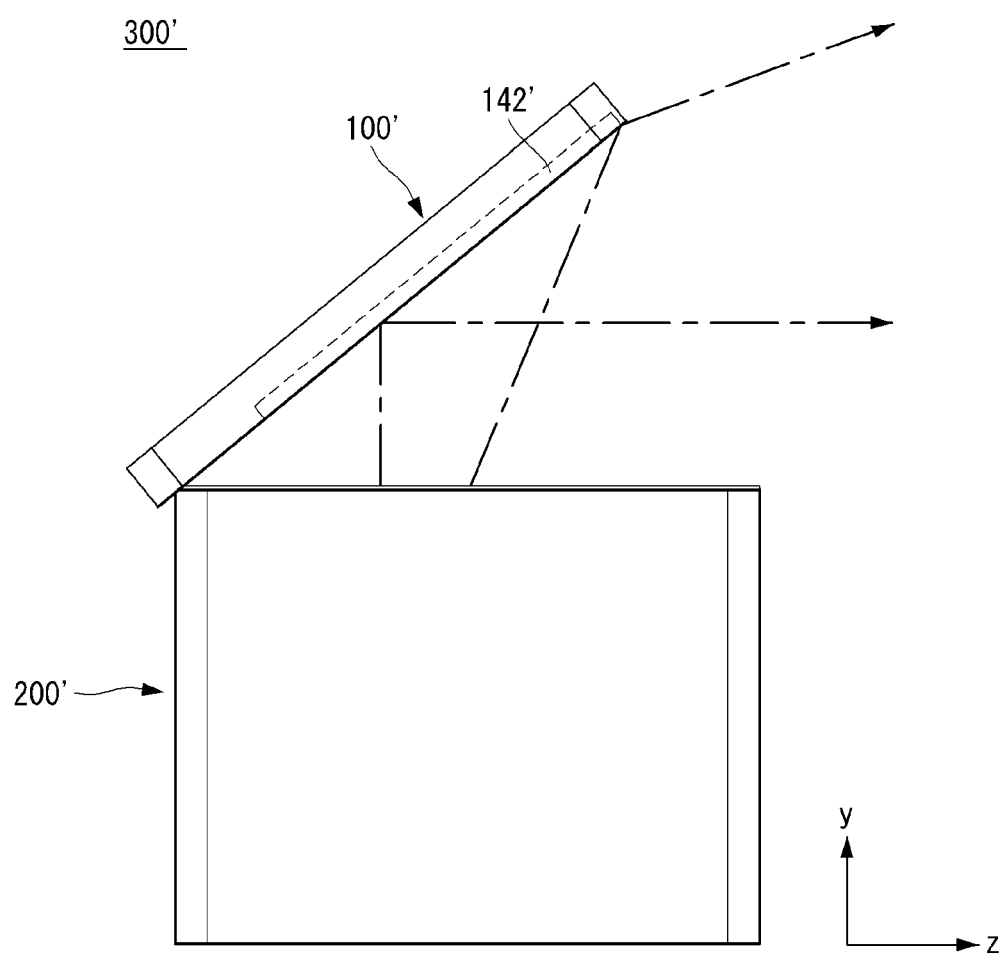

[FIG. 3]
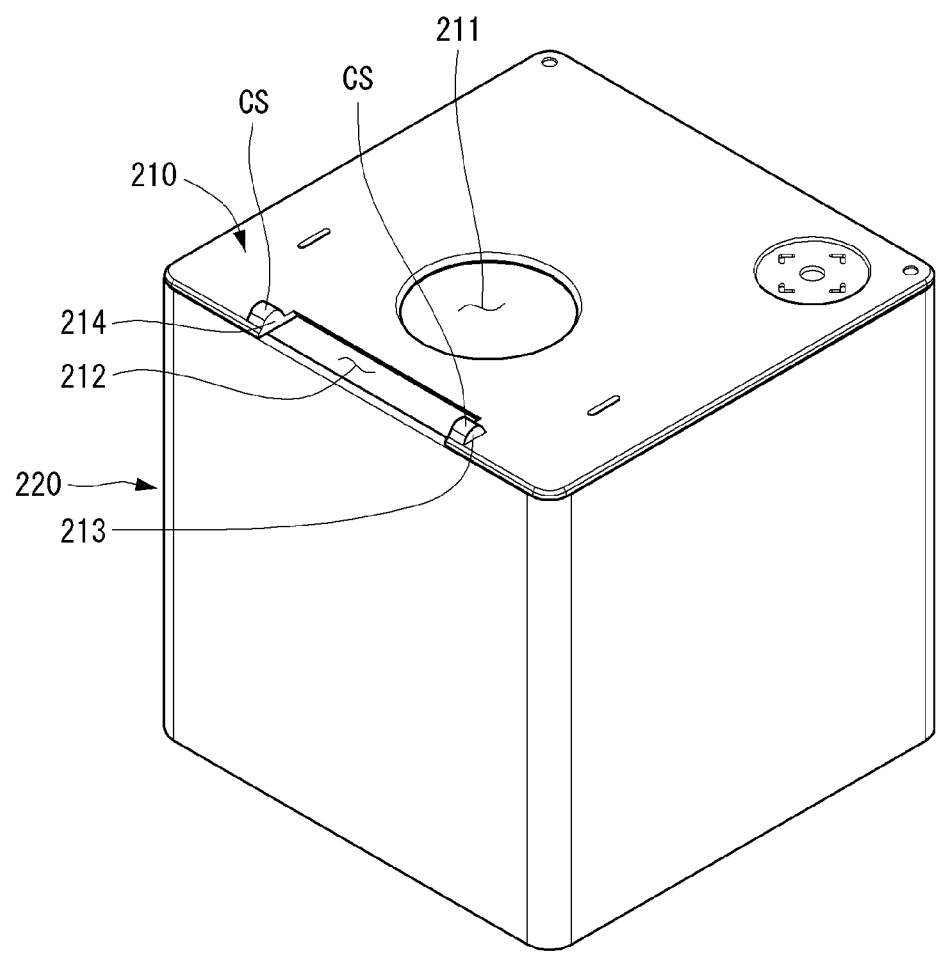

[FIG. 4]
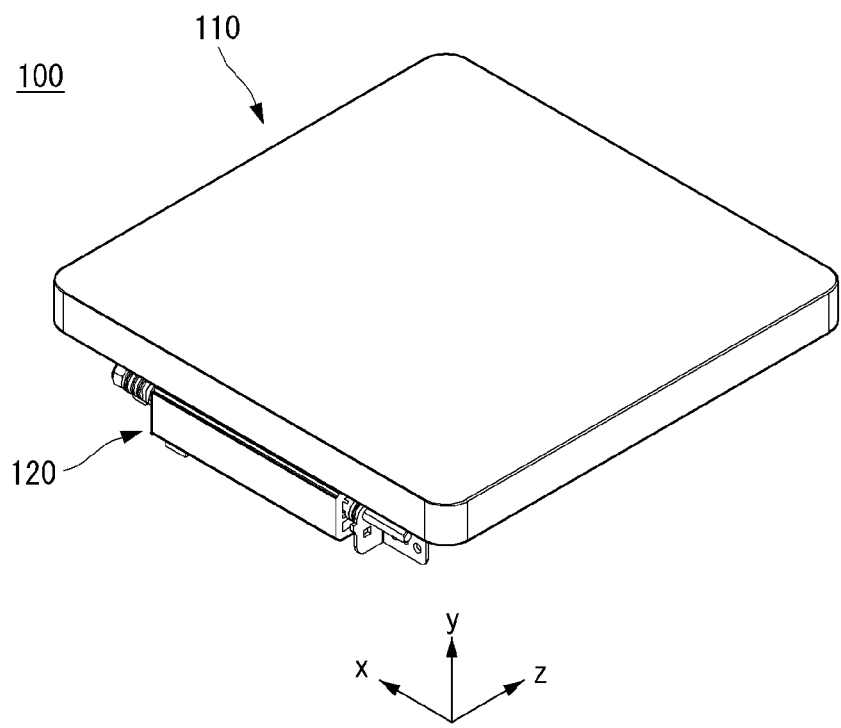

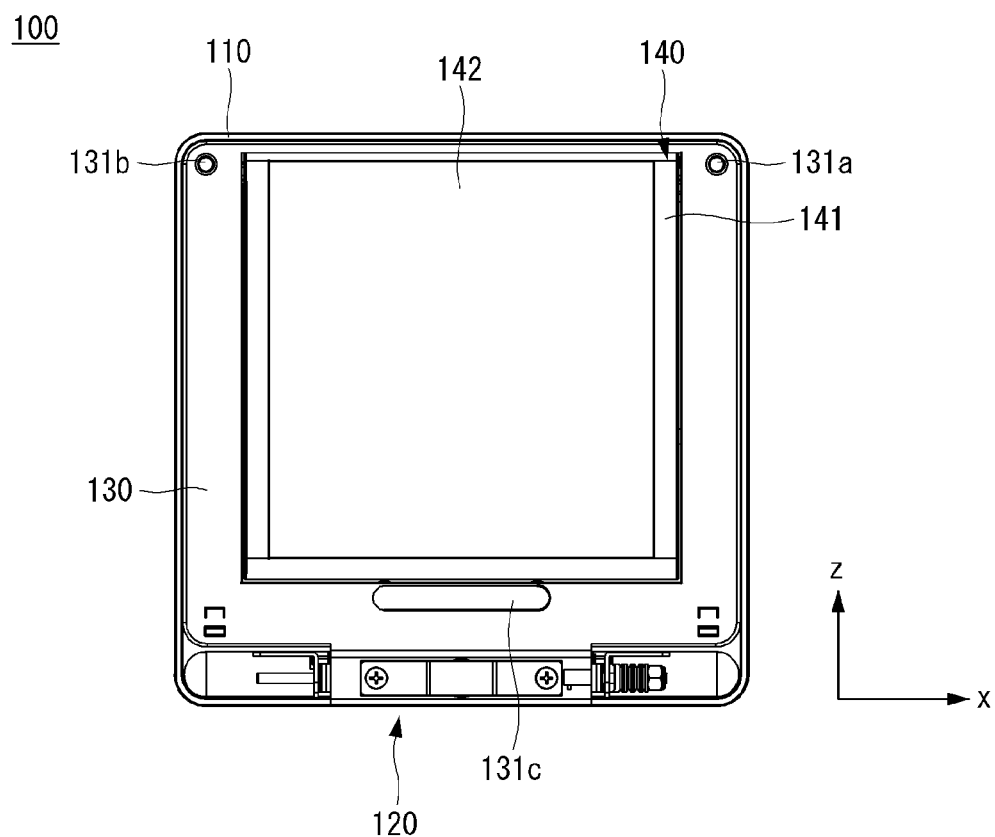

[FIG. 6]
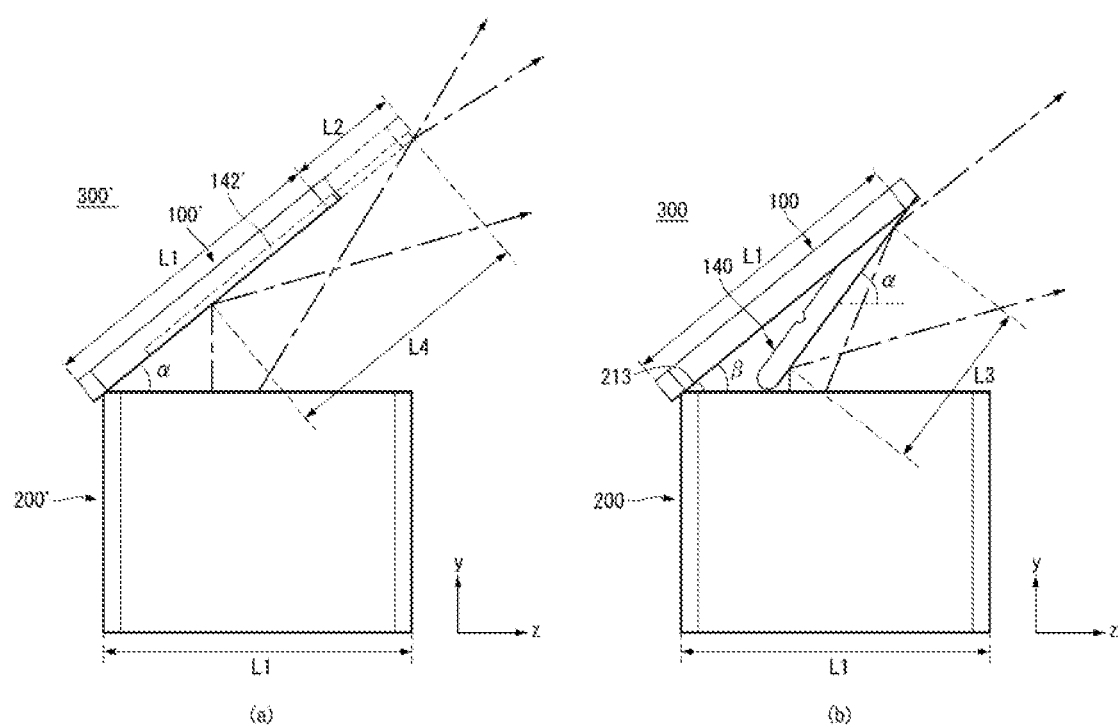

[FIG. 7]
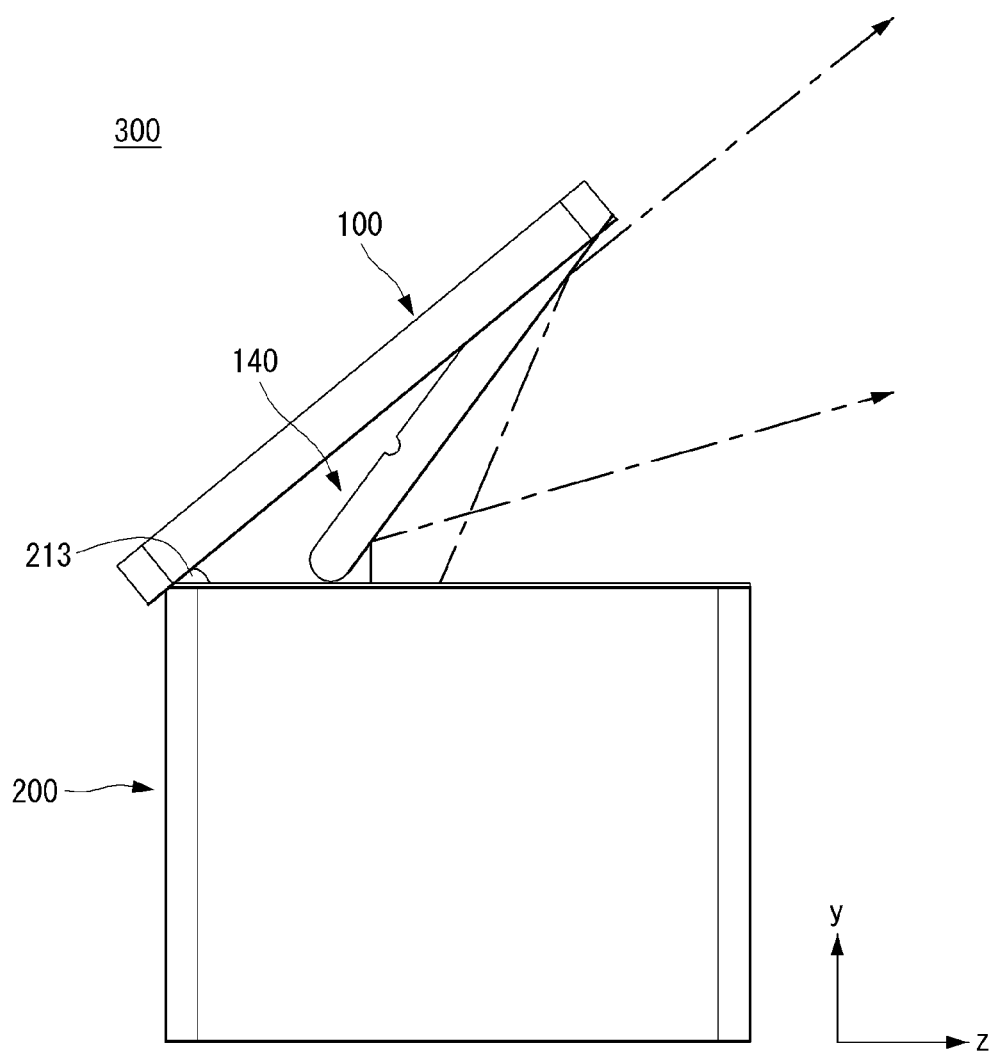

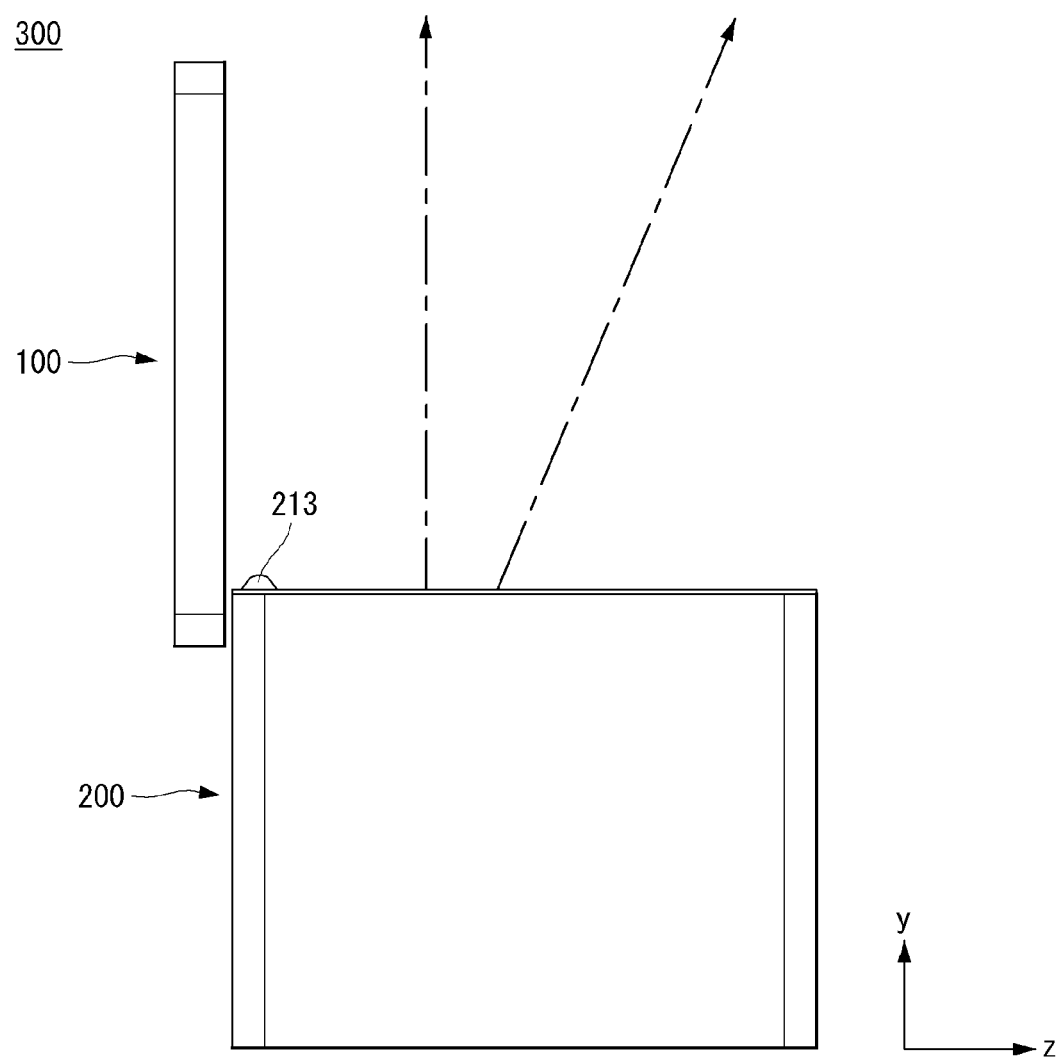
【FIG. 8】

[FIG. 9]
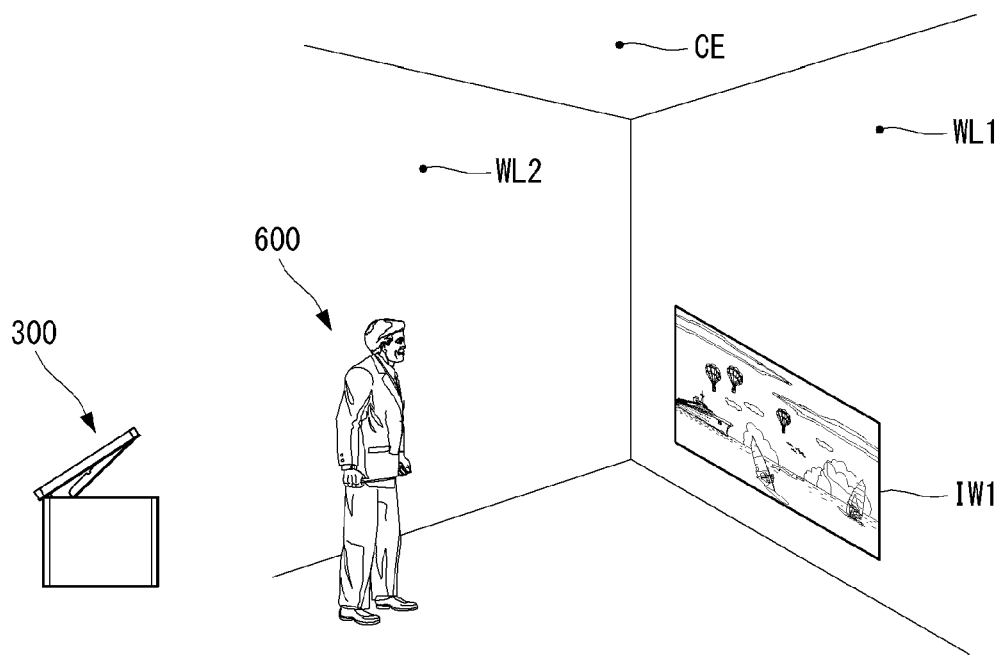

[FIG. 10]
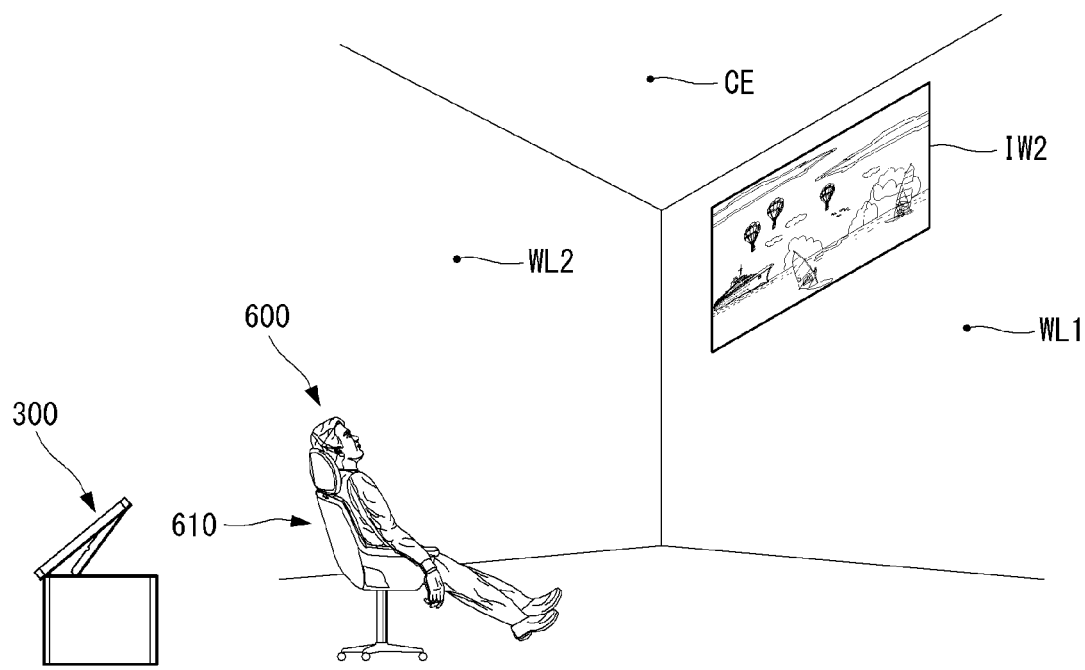

[FIG. 11]
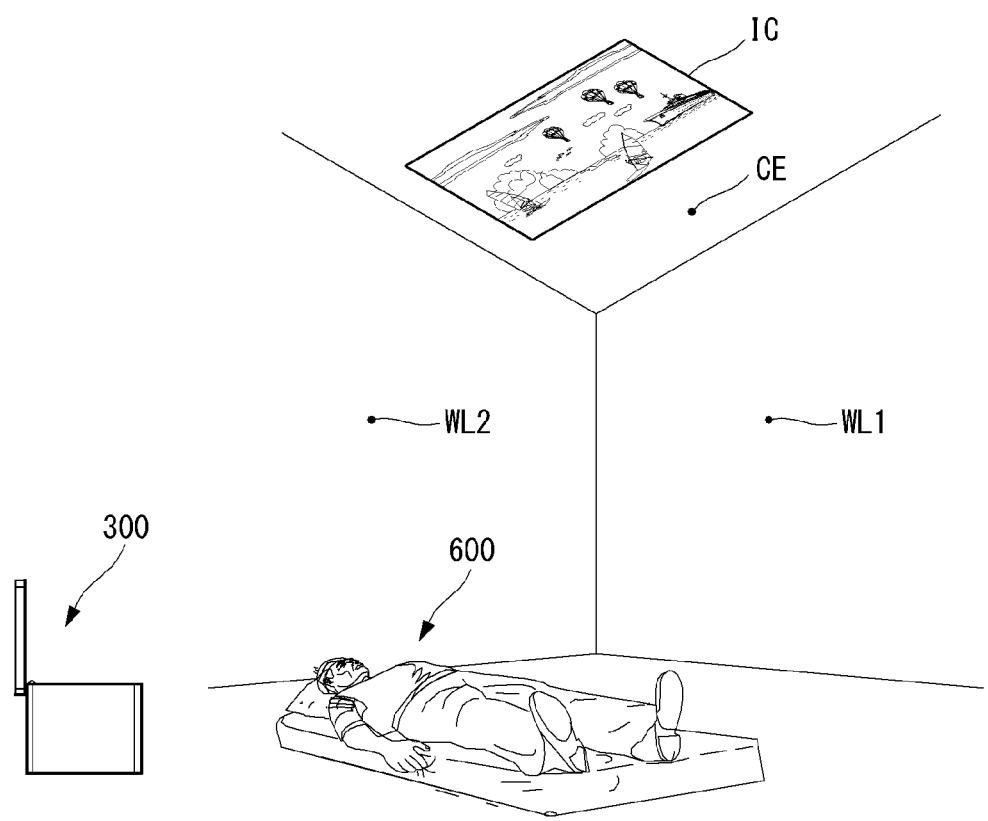

【FIG. 12】
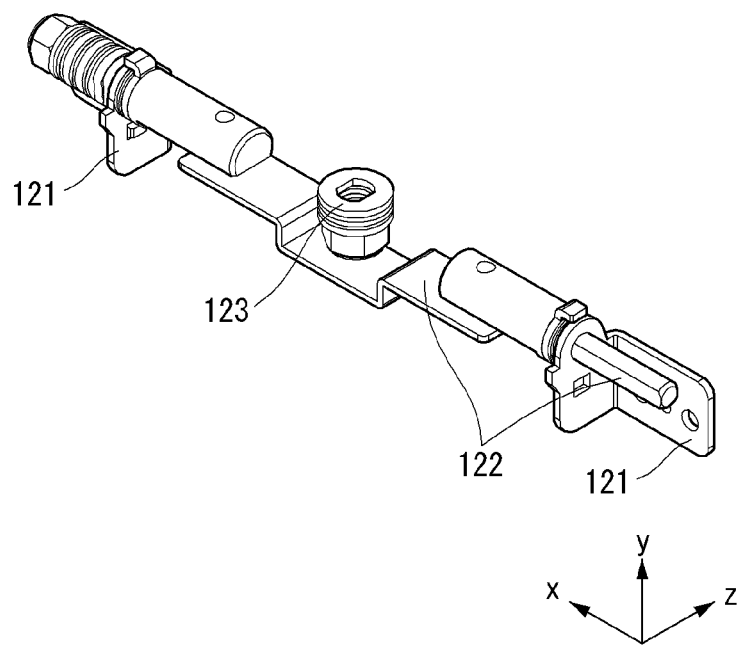

[FIG. 13]
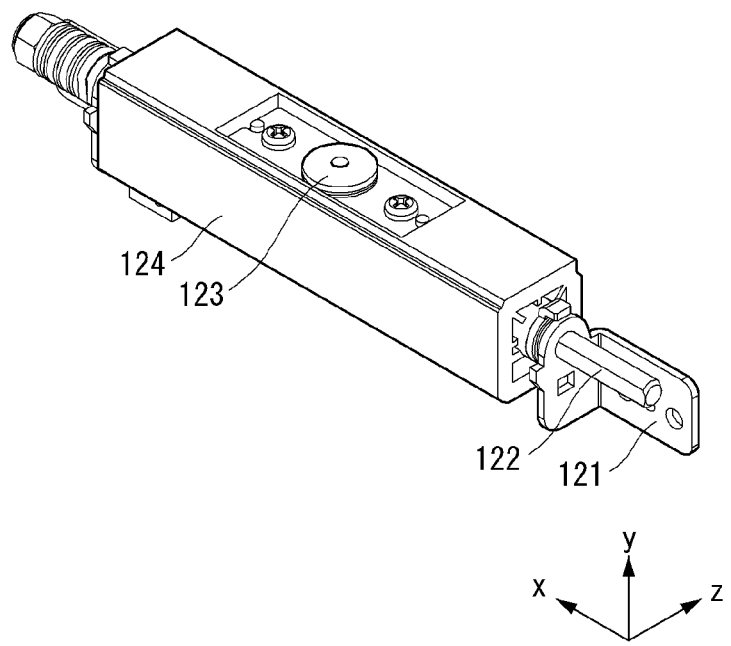

【FIG. 14】
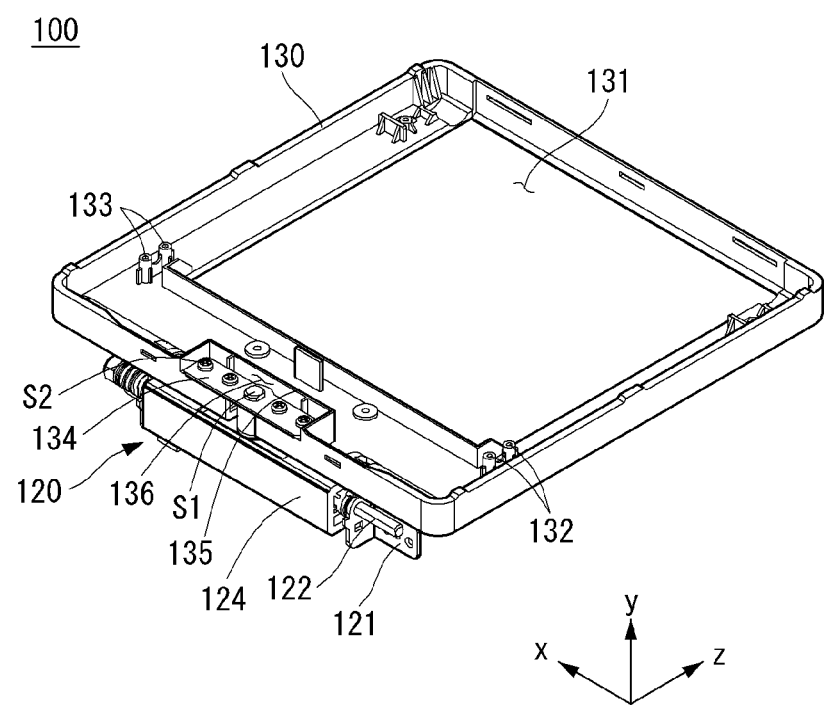

【FIG. 15】
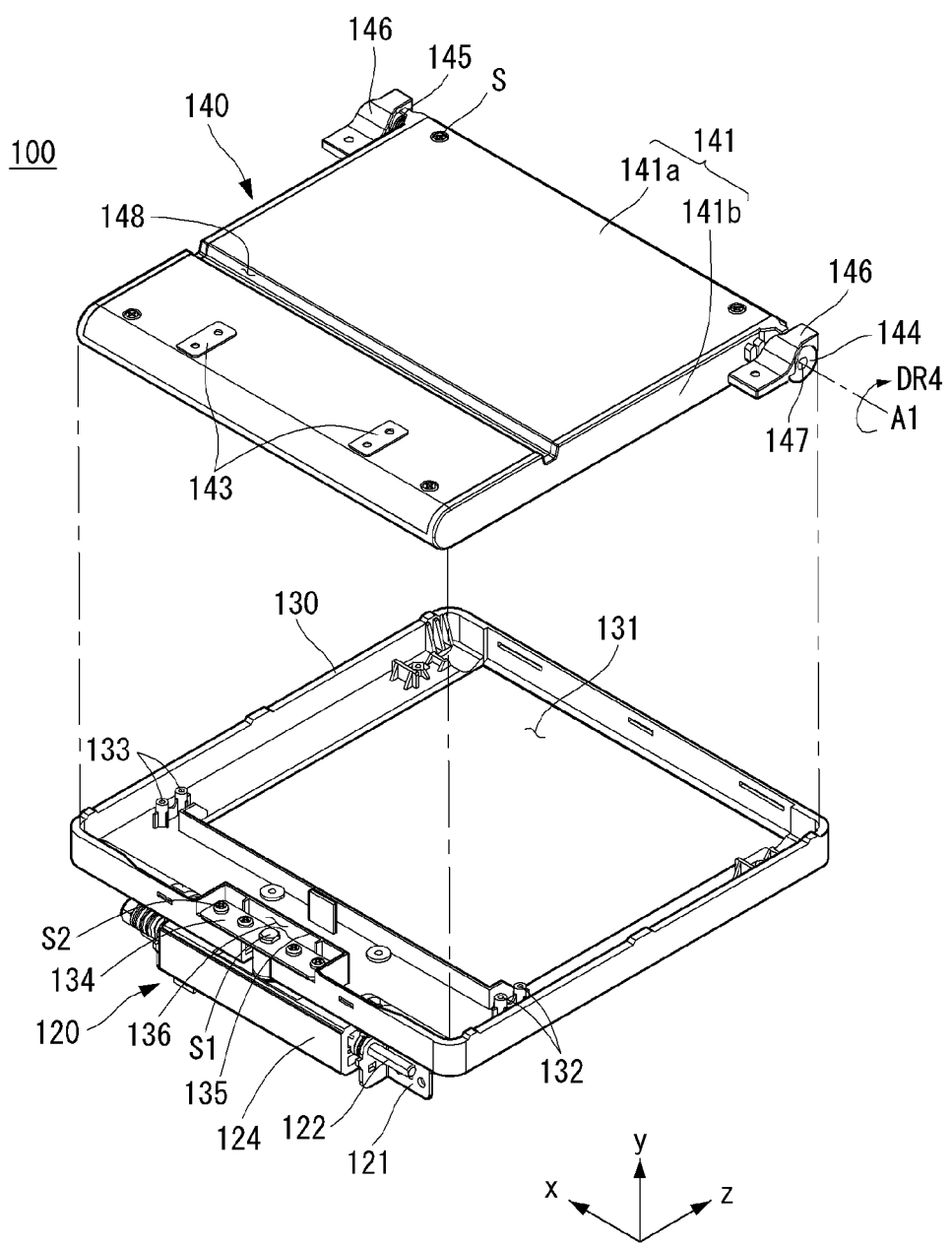

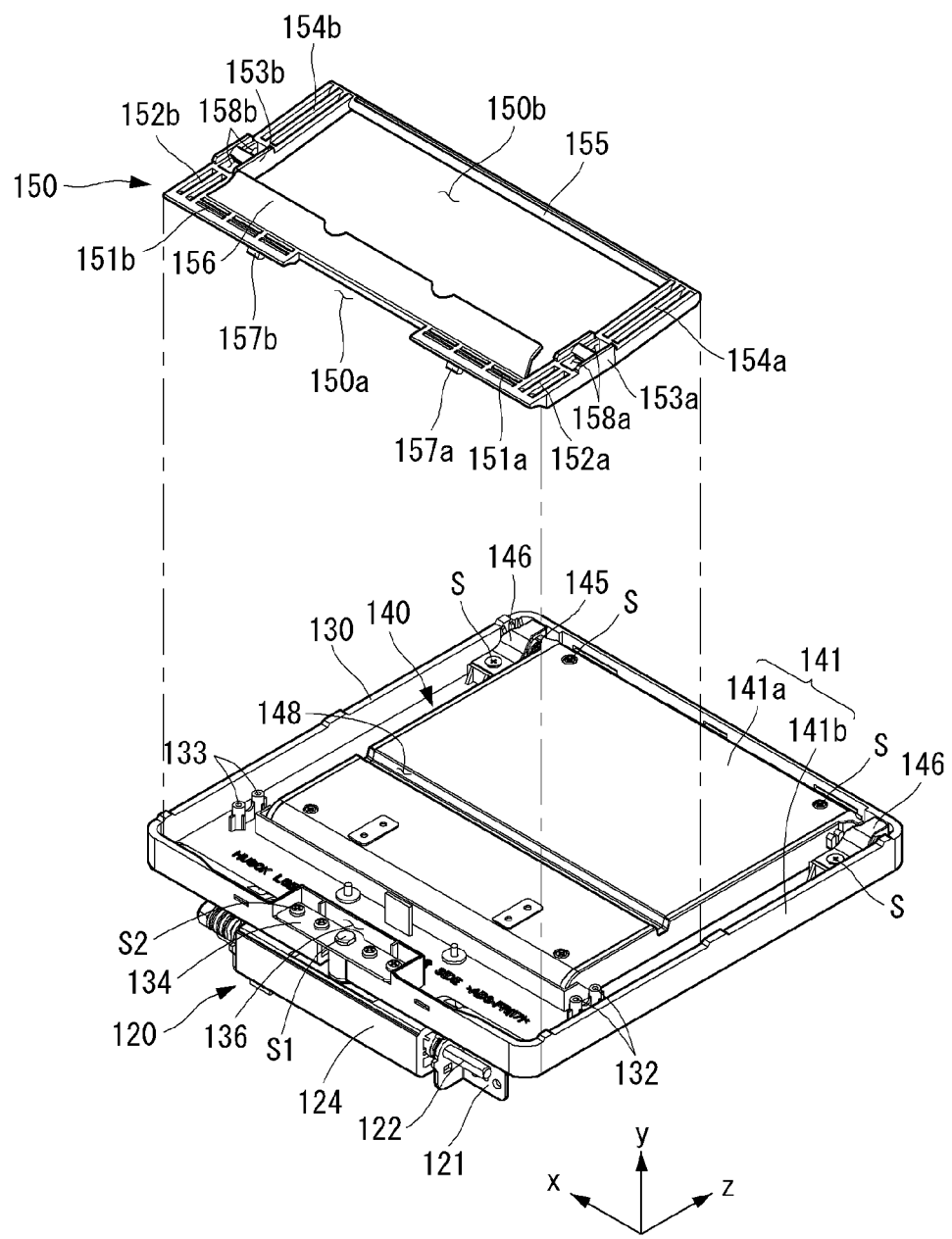
[FIG. 16]

【FIG. 17】
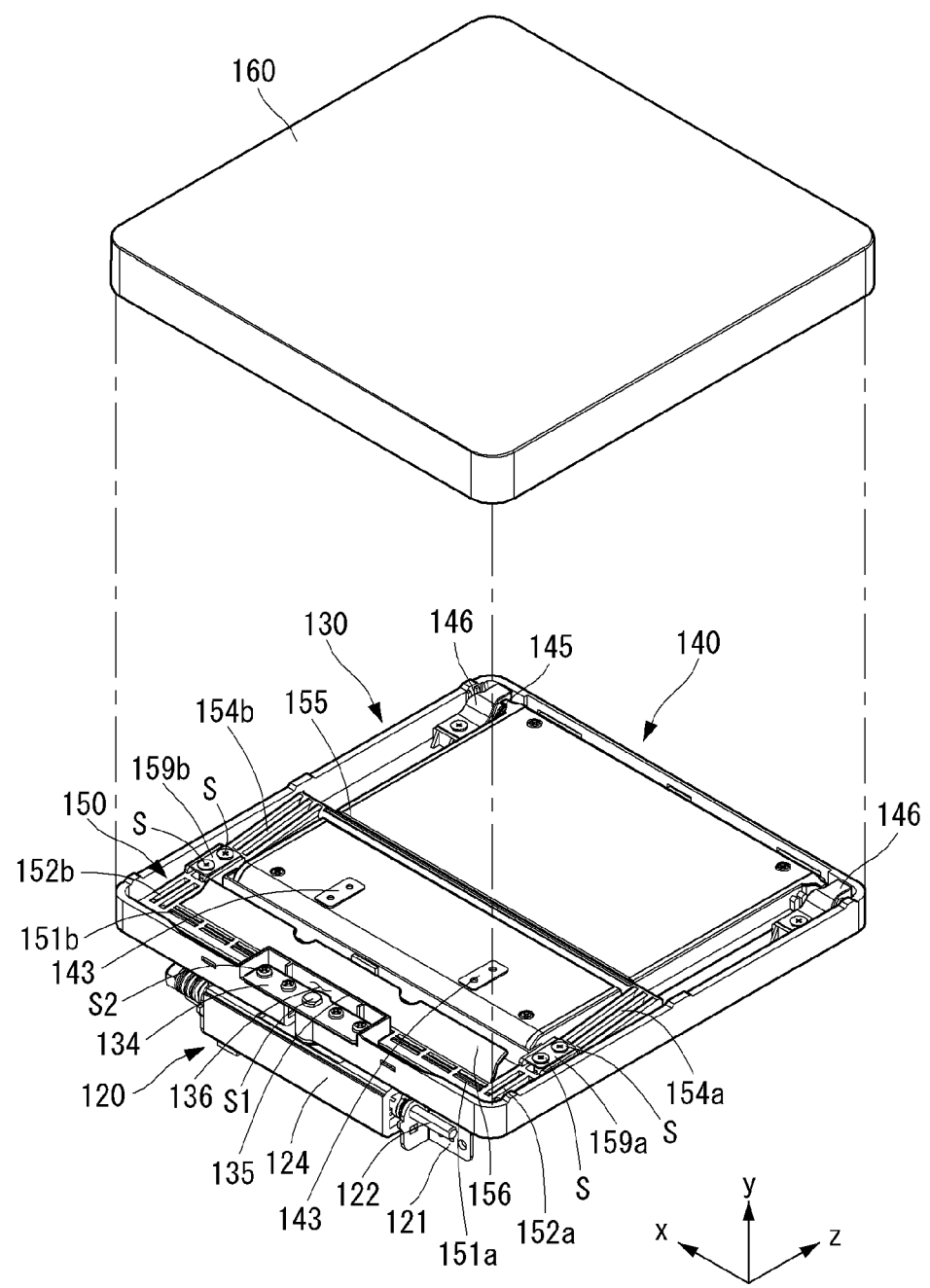

[FIG. 18]
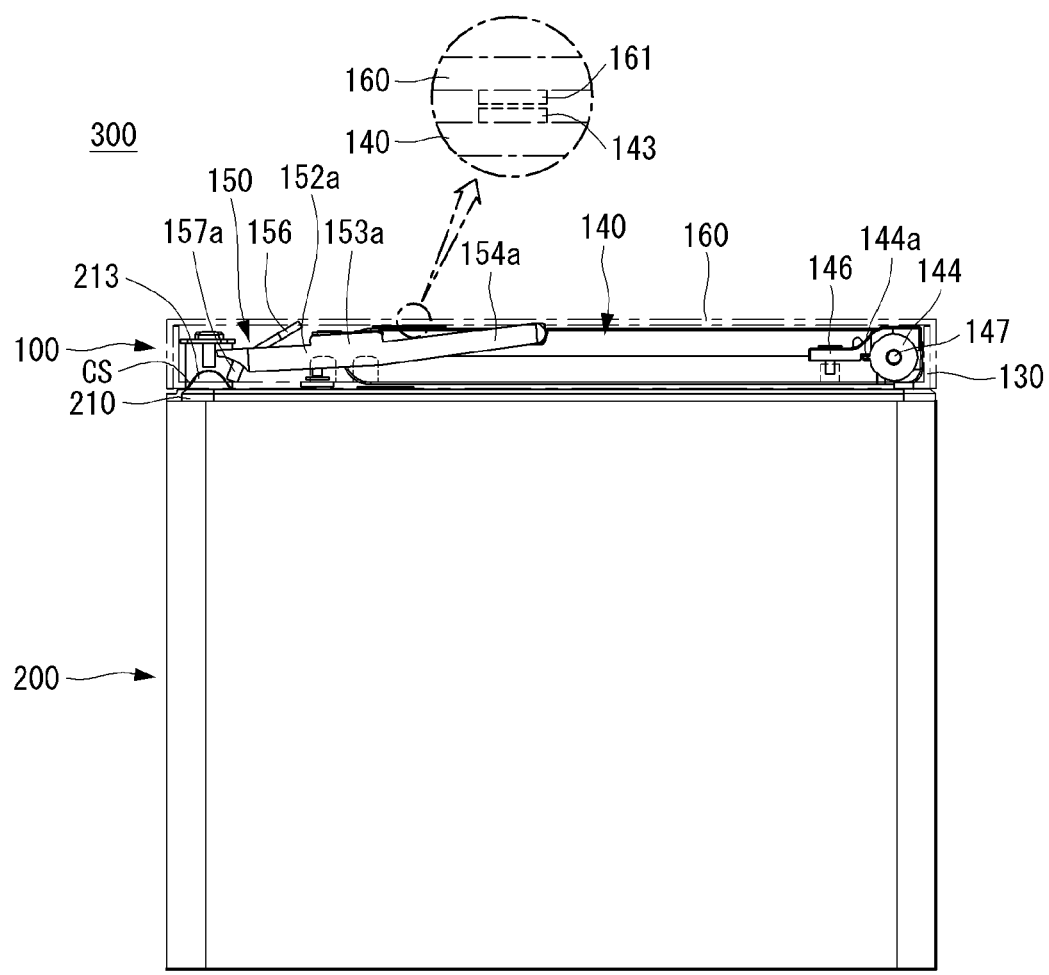

[FIG. 19]
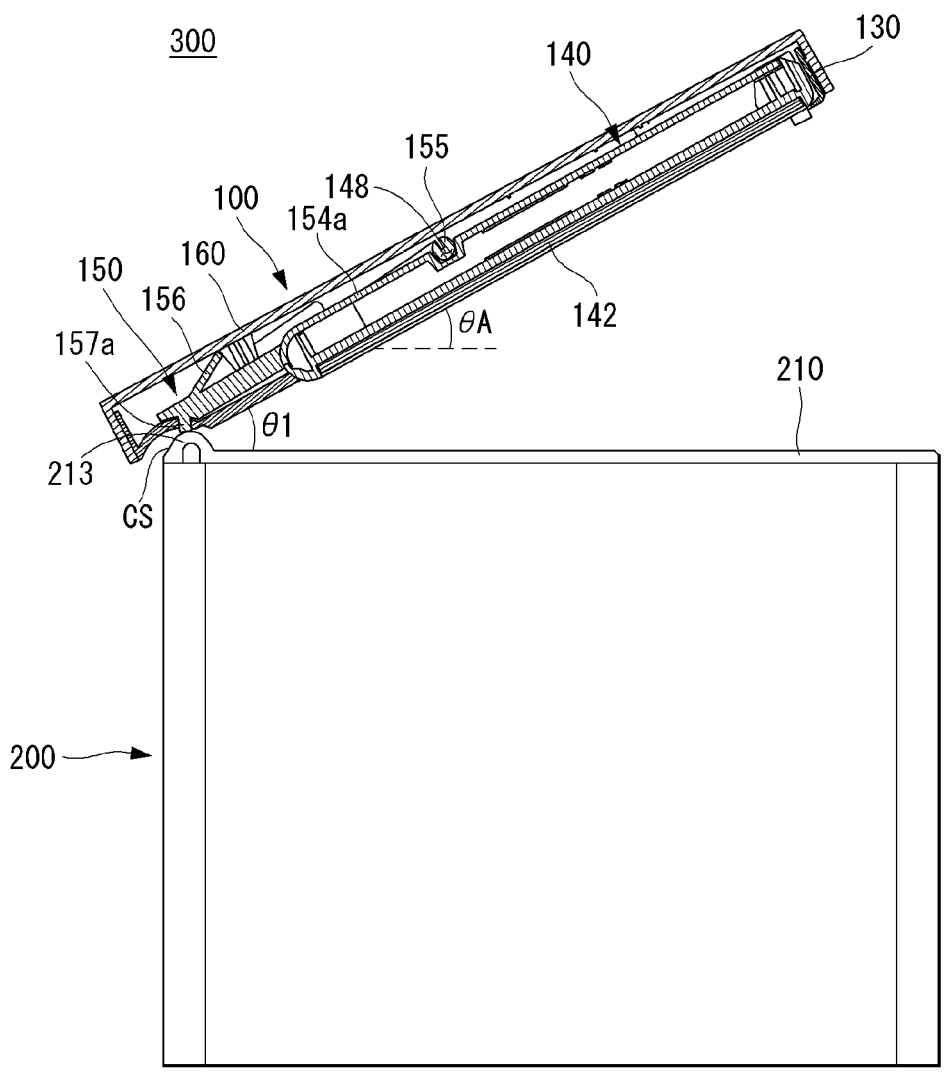

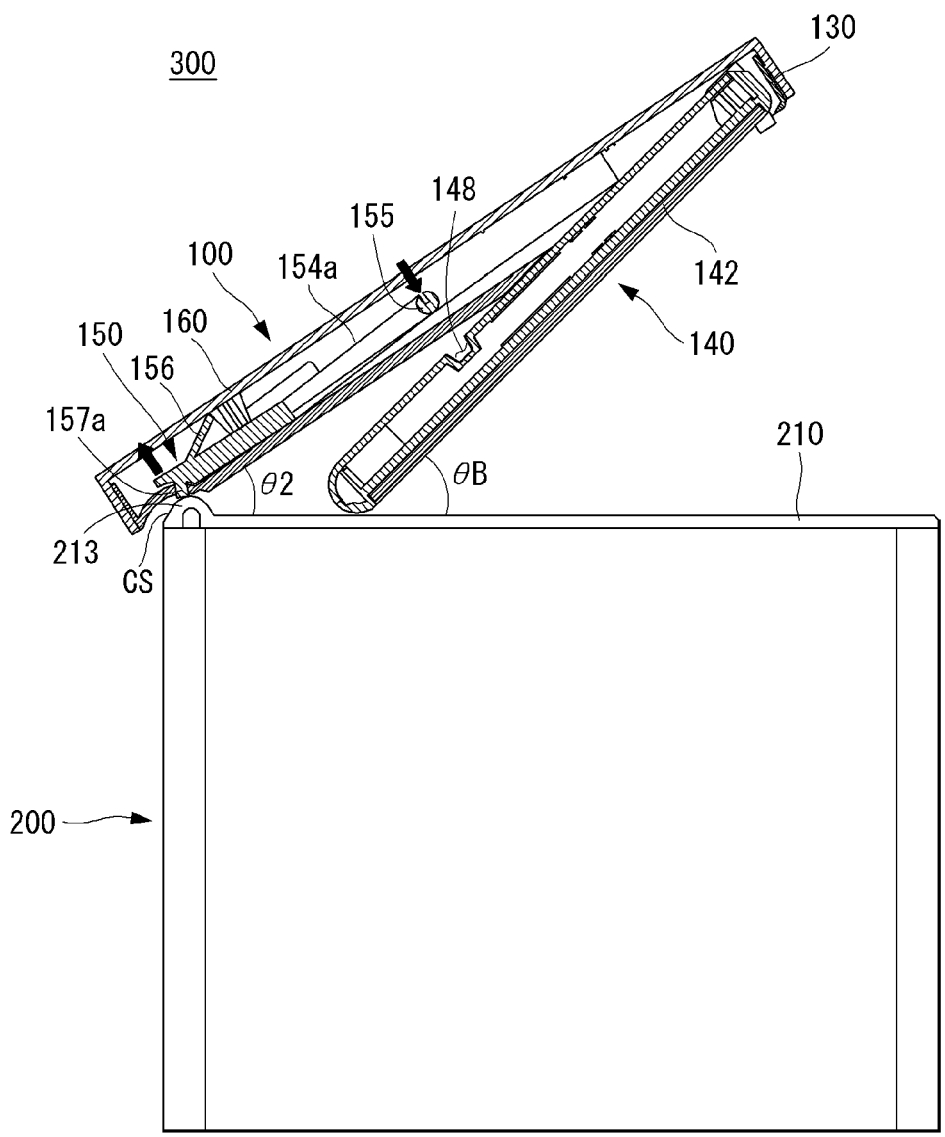
[FIG. 20]

[FIG. 21]
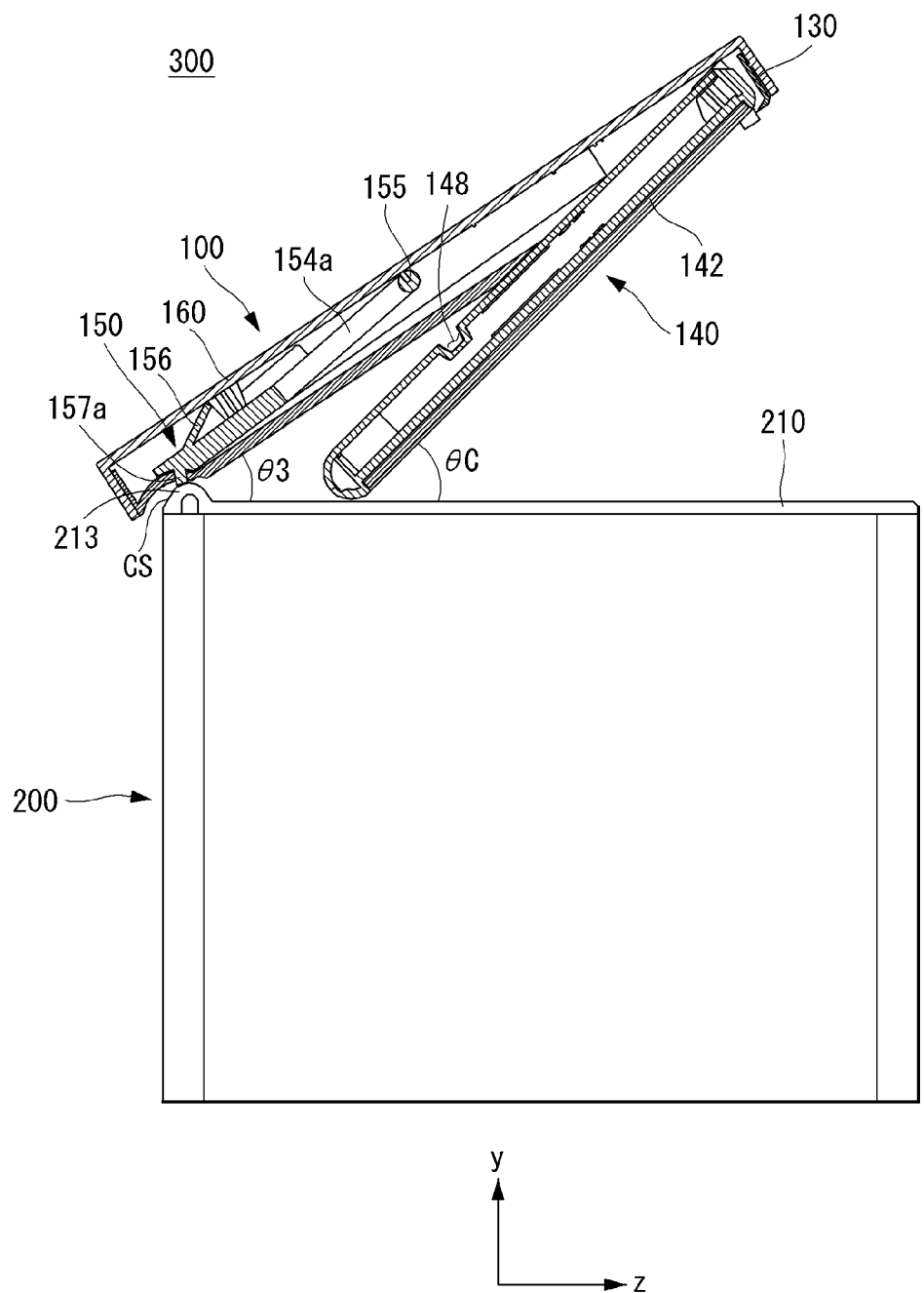

[FIG. 22]
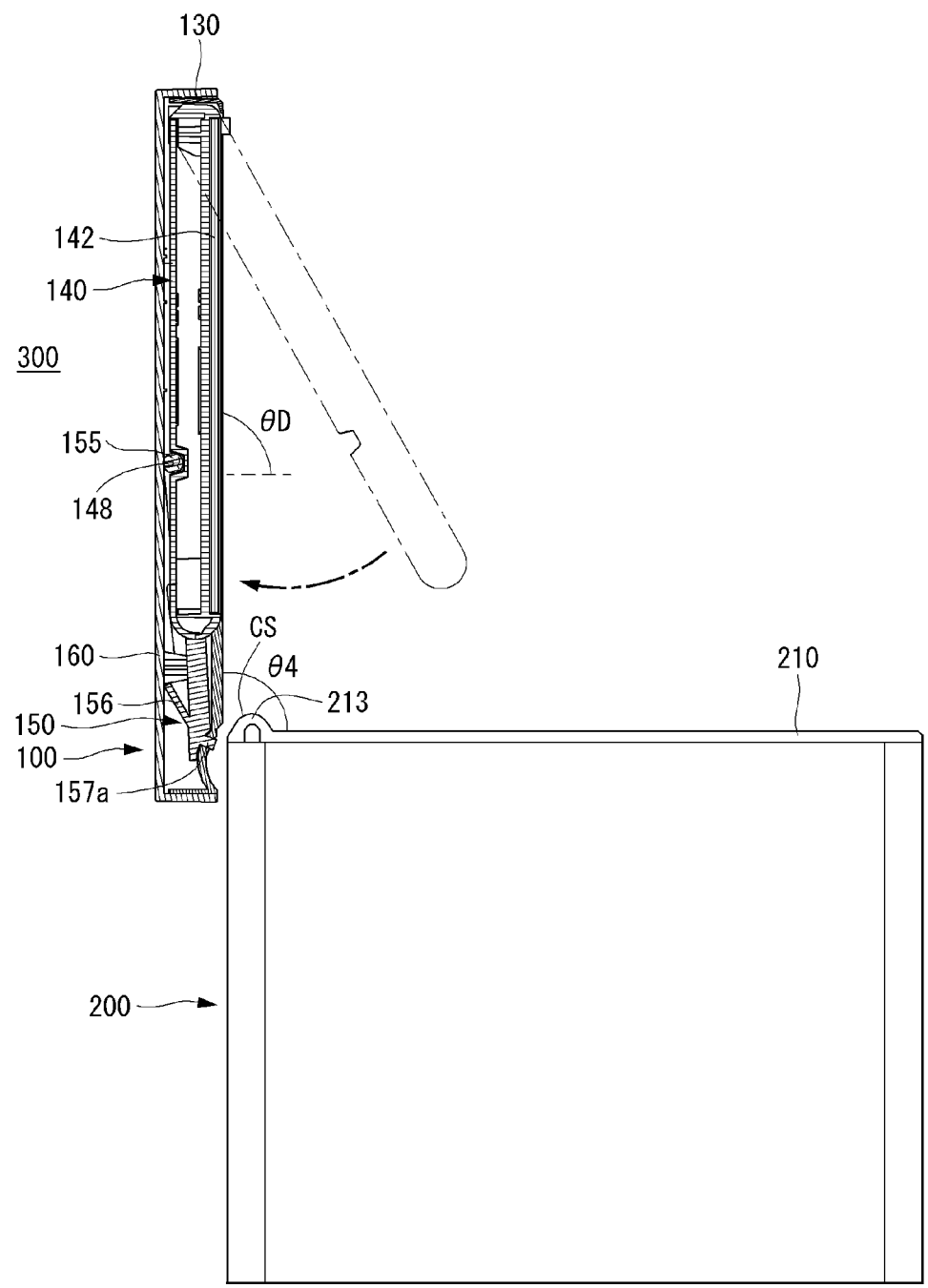
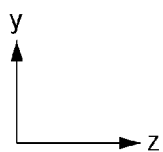

[FIG. 23]
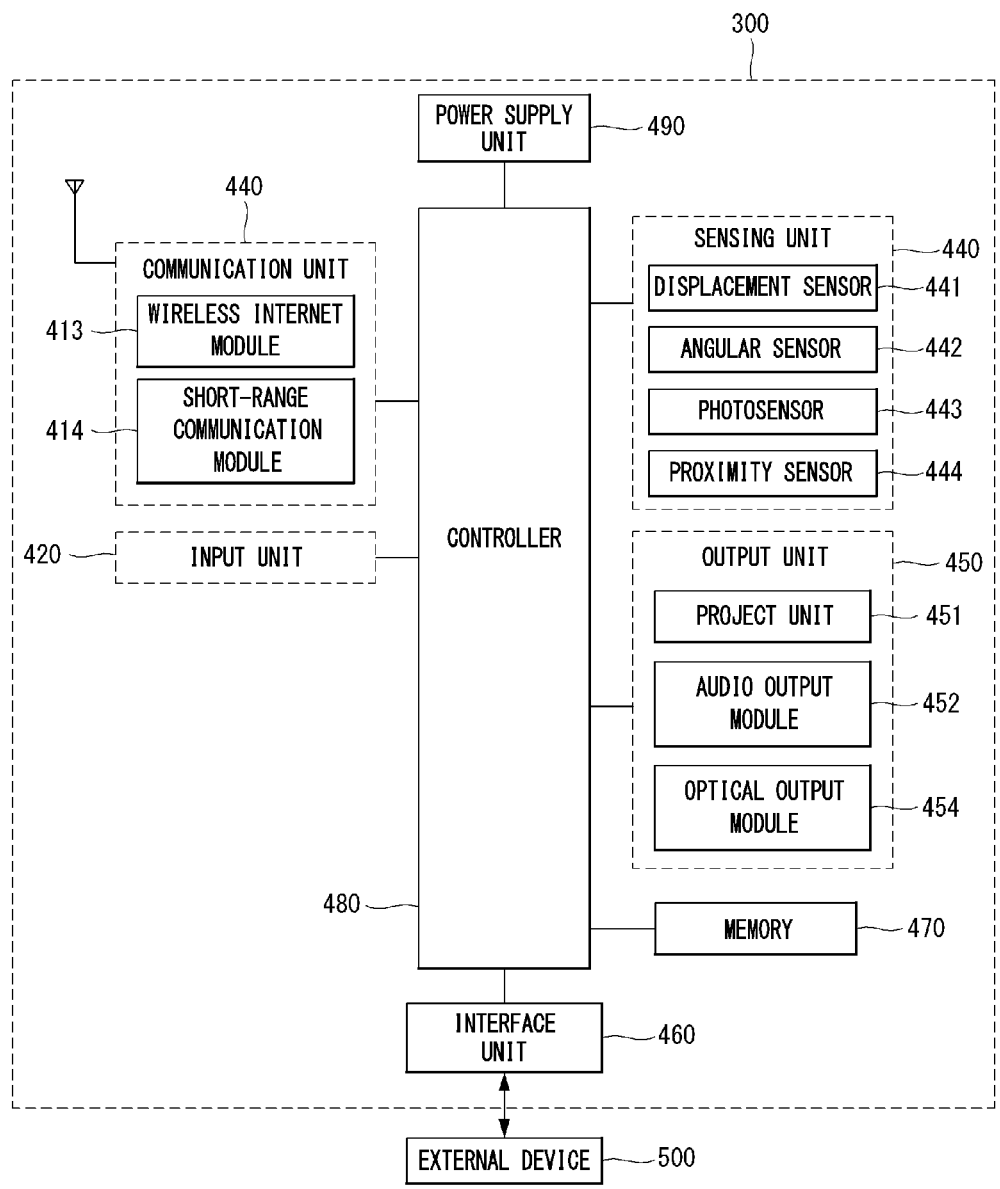

[FIG. 24]
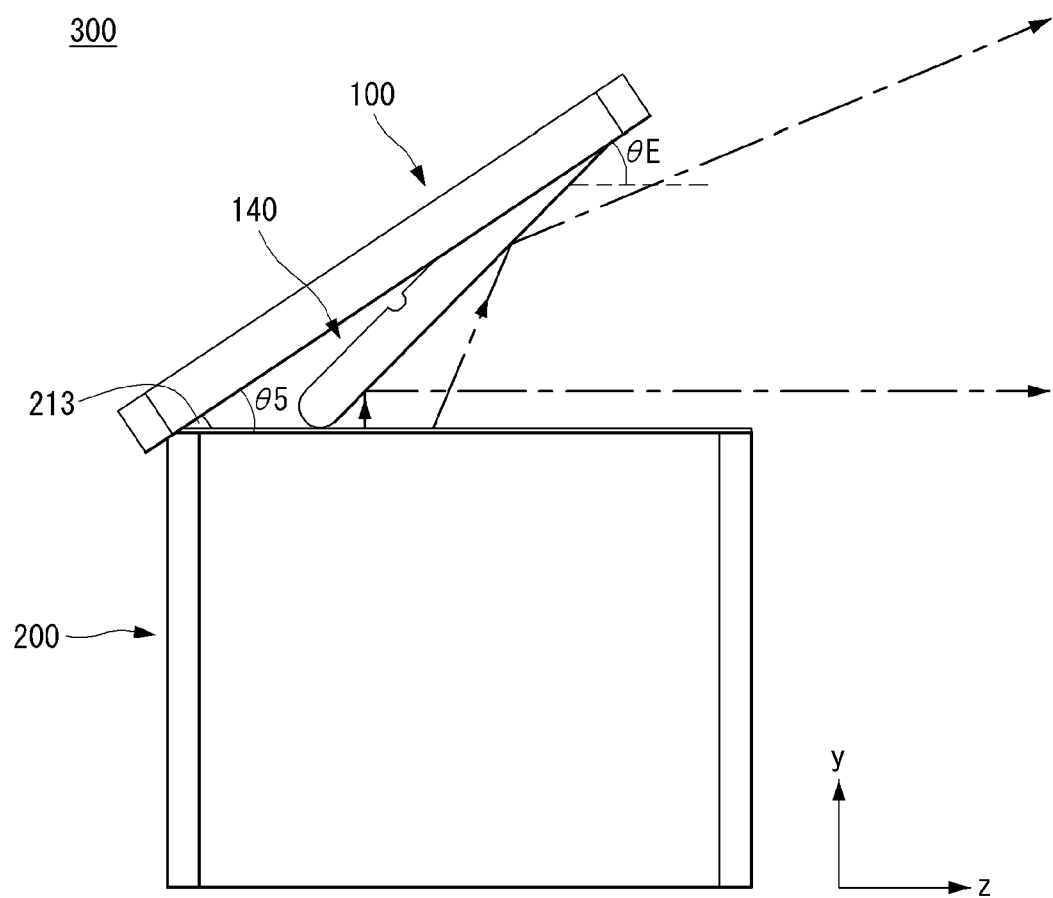

[FIG. 25]
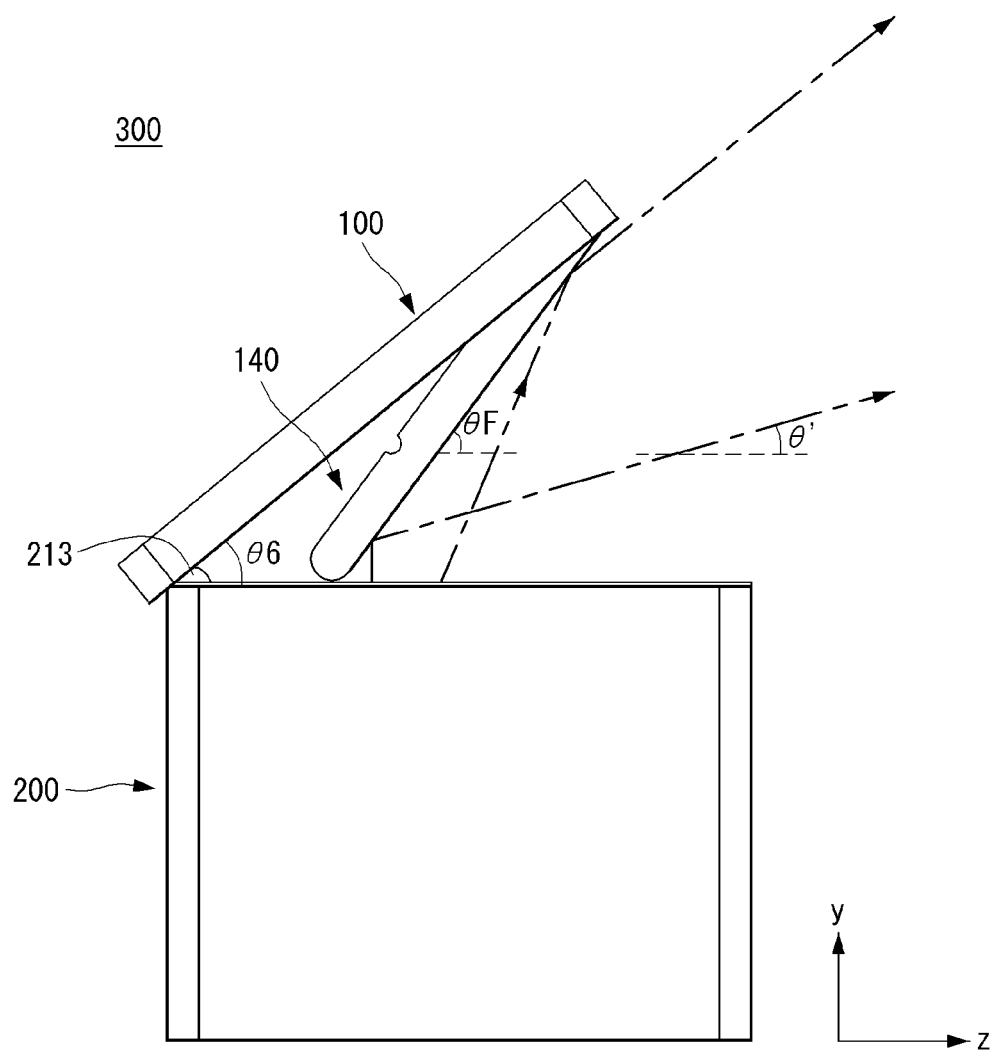

[FIG. 26]
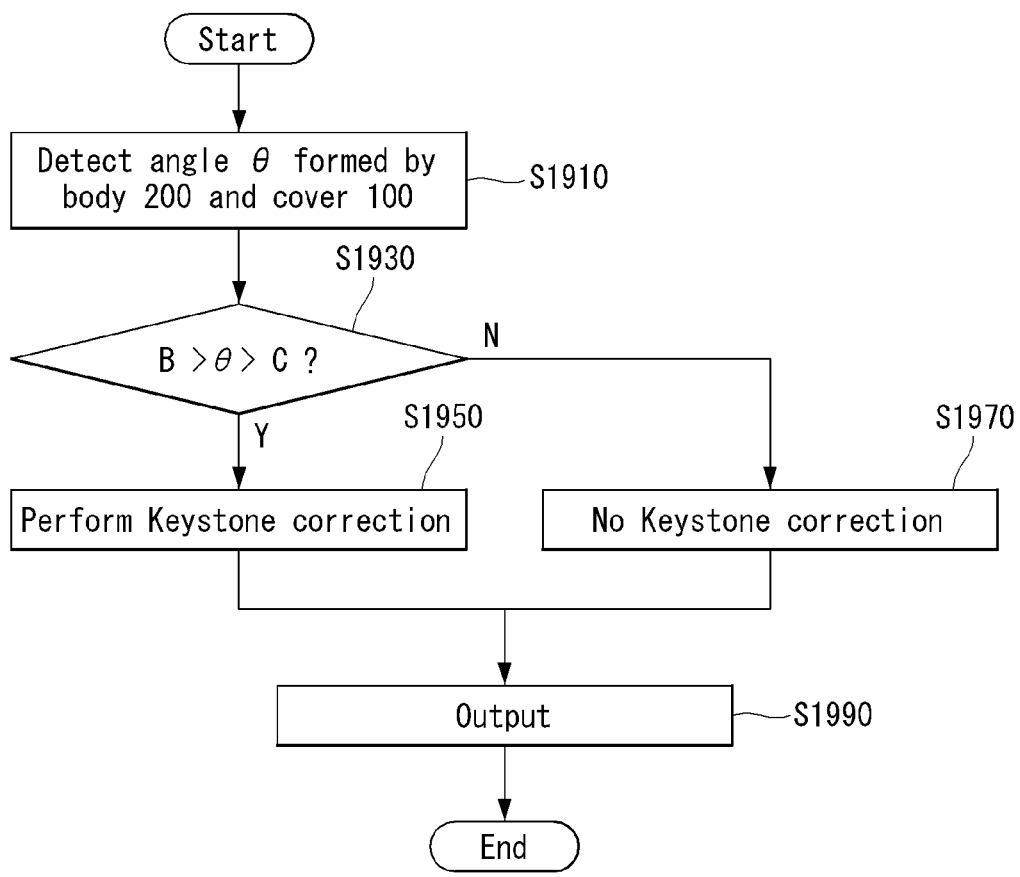

[FIG. 27]
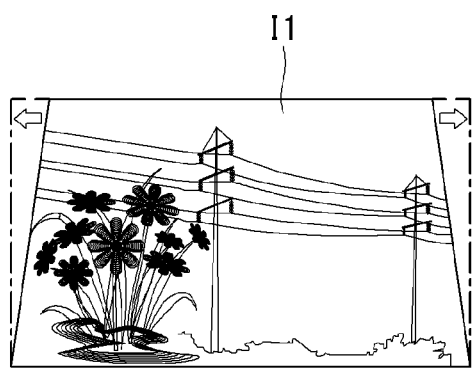
(a)
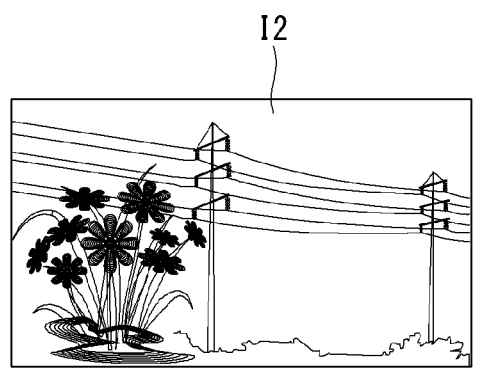
(b)

【FIG. 28】
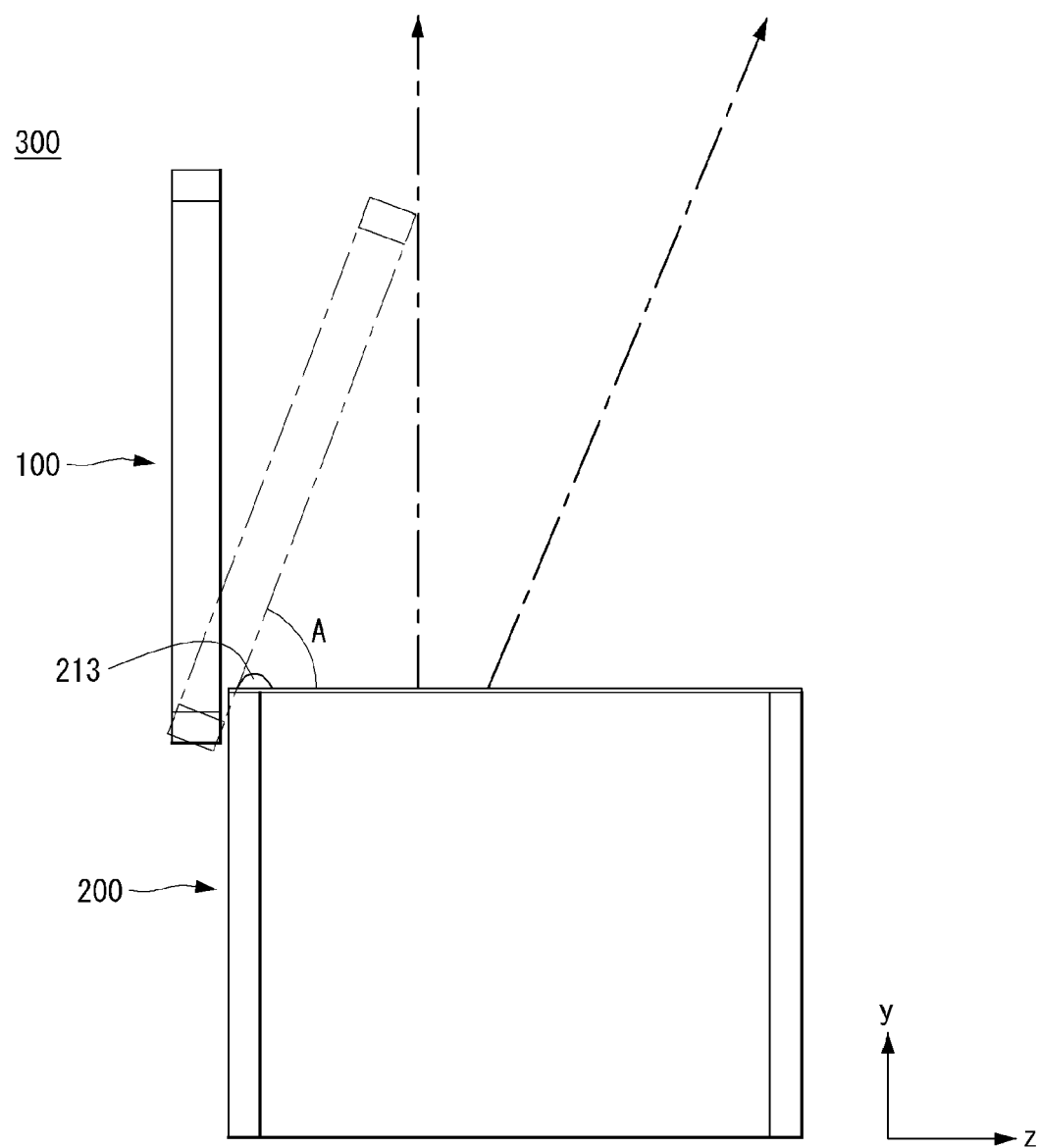

[FIG. 29]
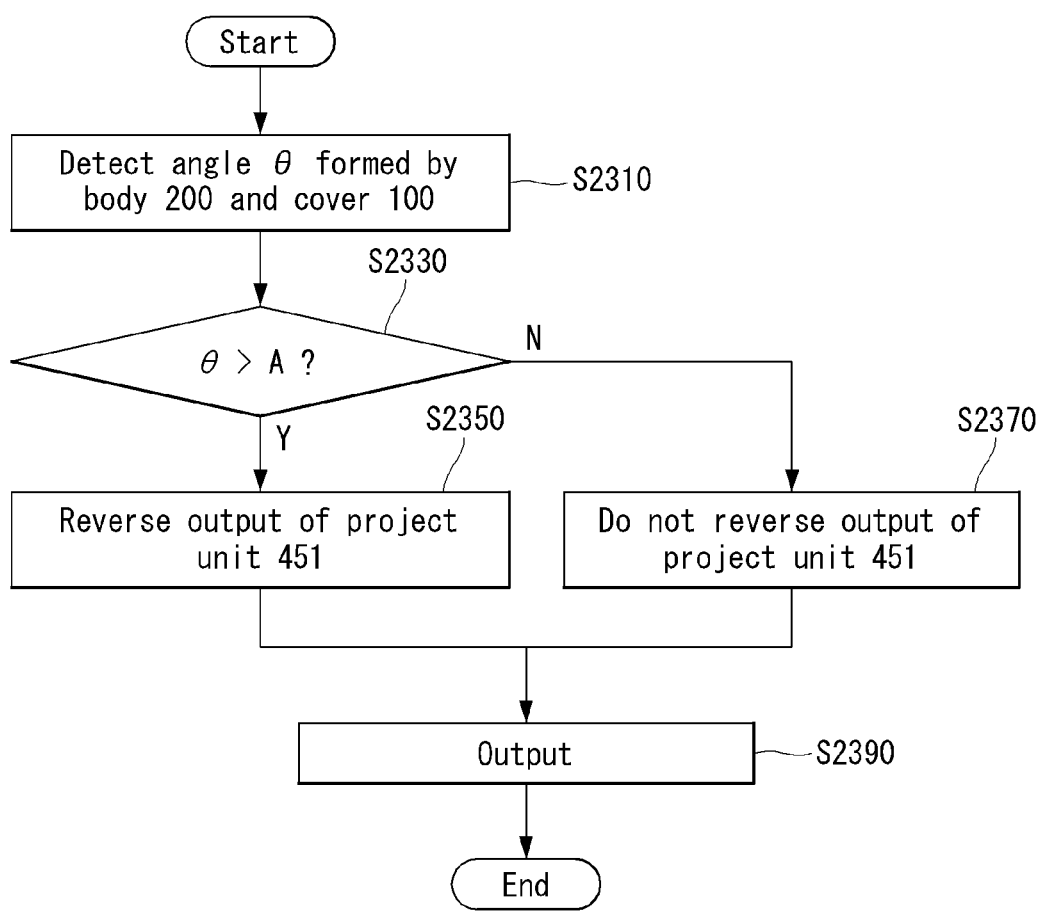

[FIG. 30]
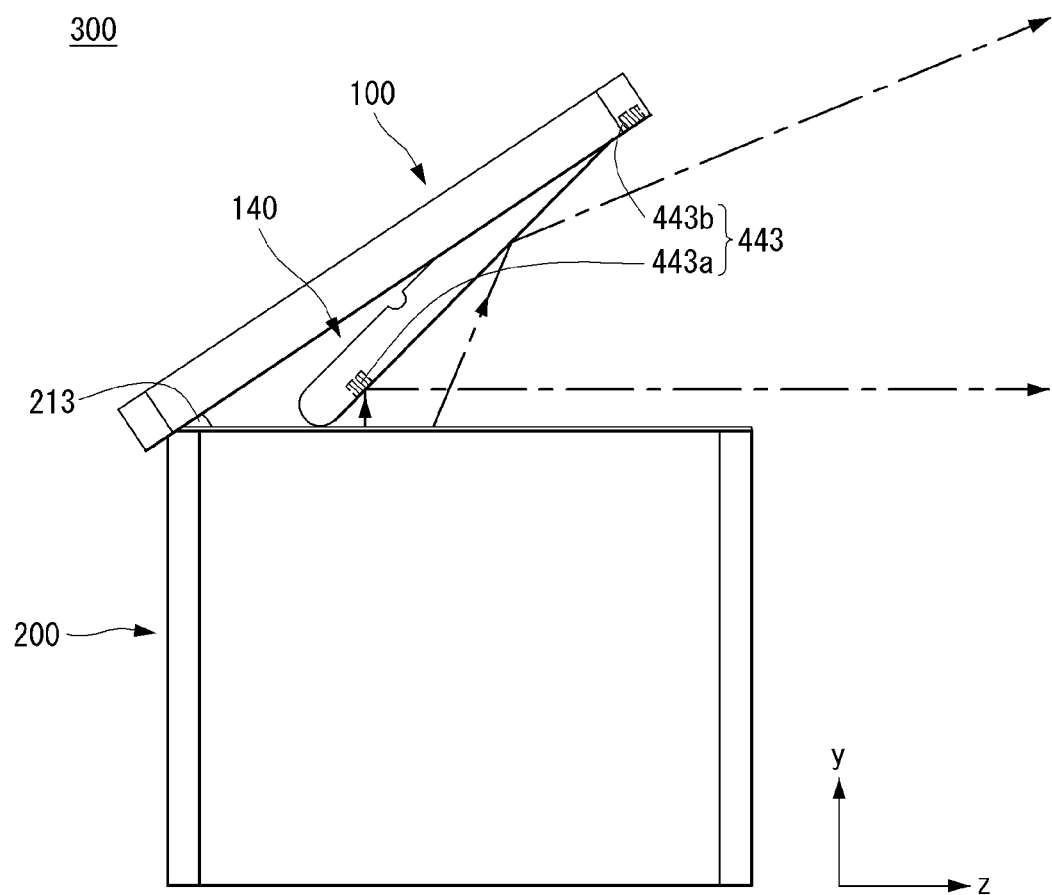

[FIG. 31]
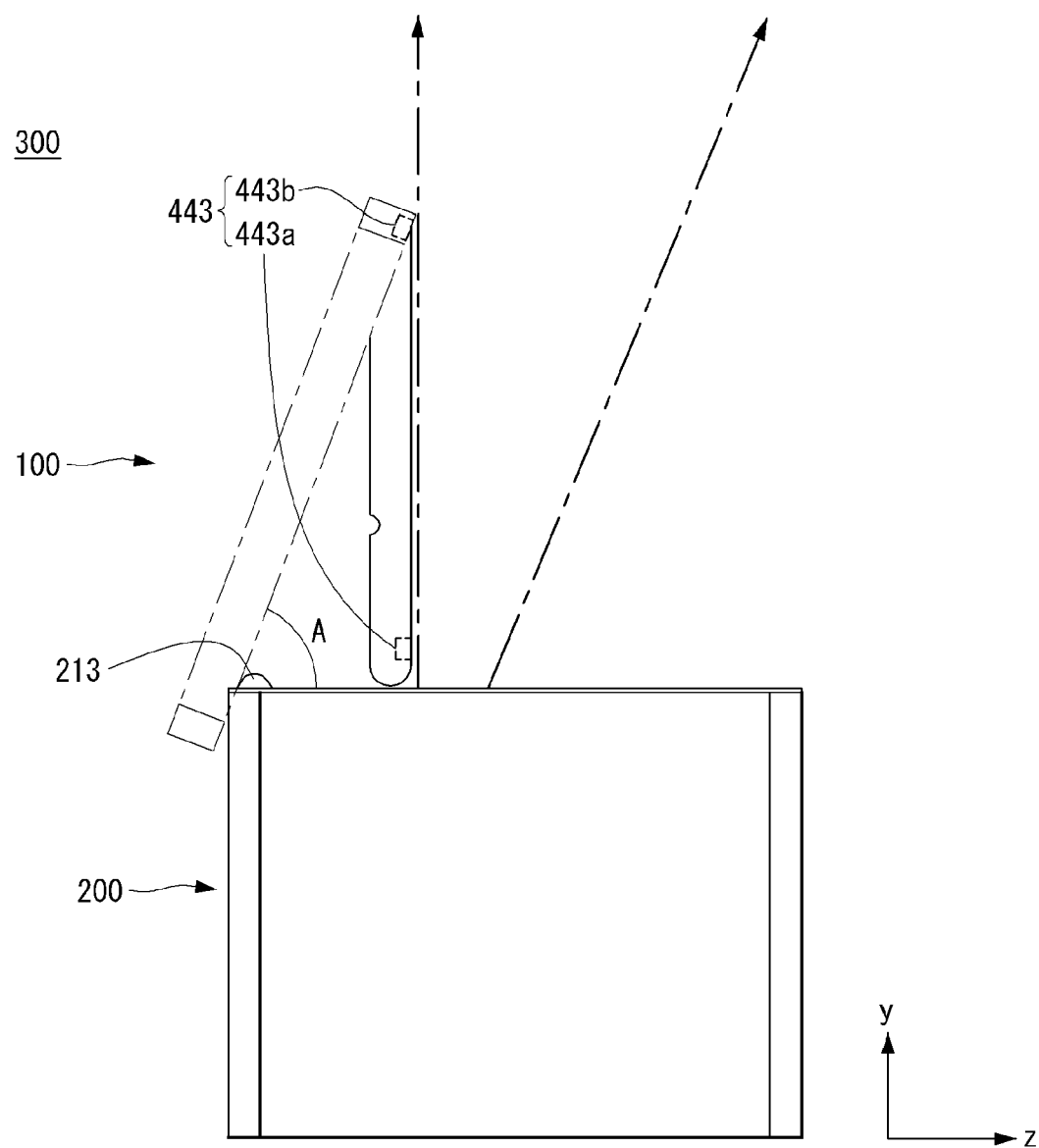

[FIG. 32]
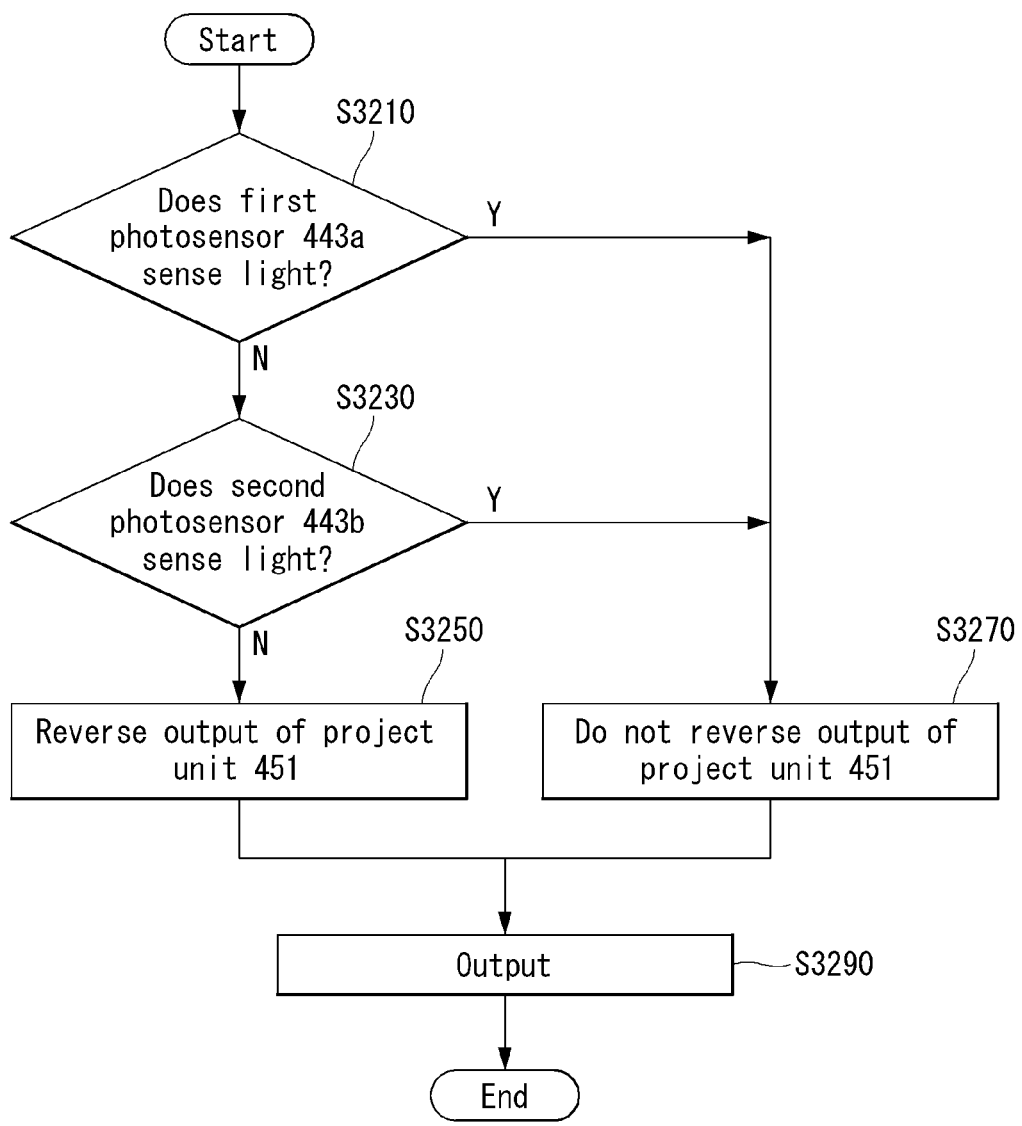

[FIG. 33]
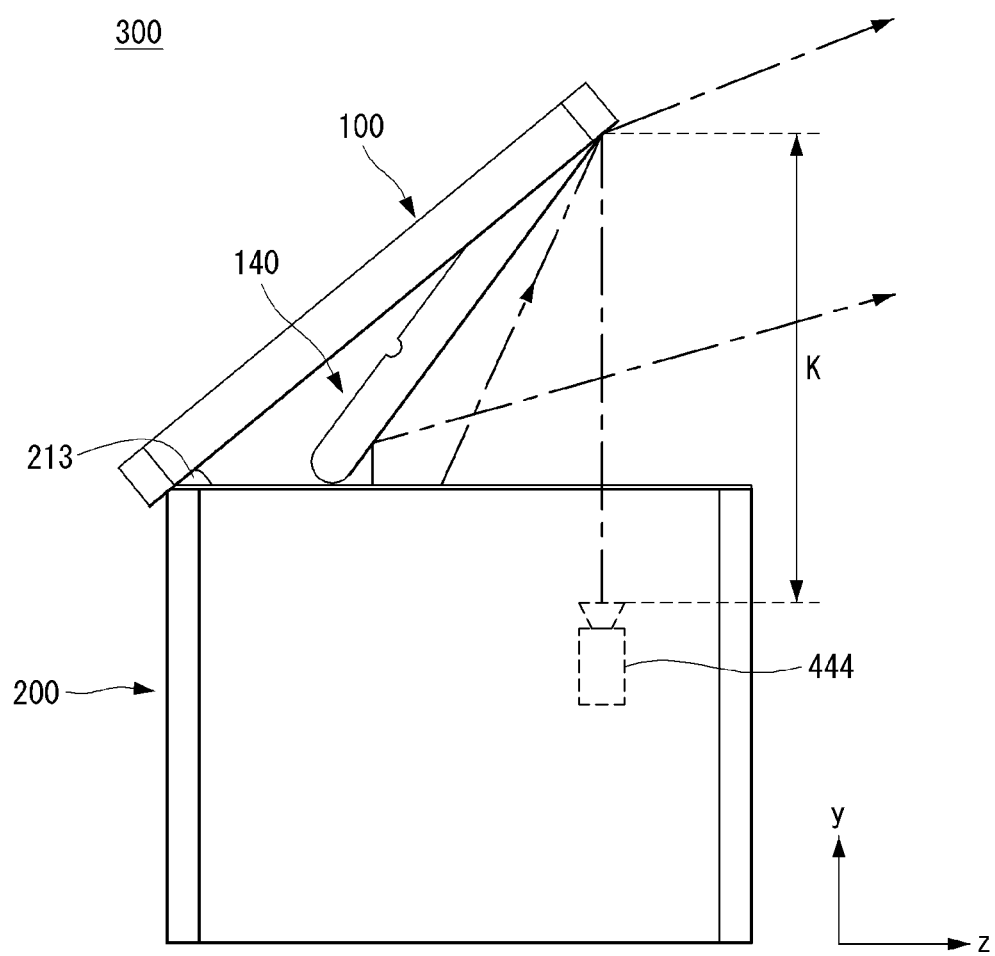

[FIG. 34]
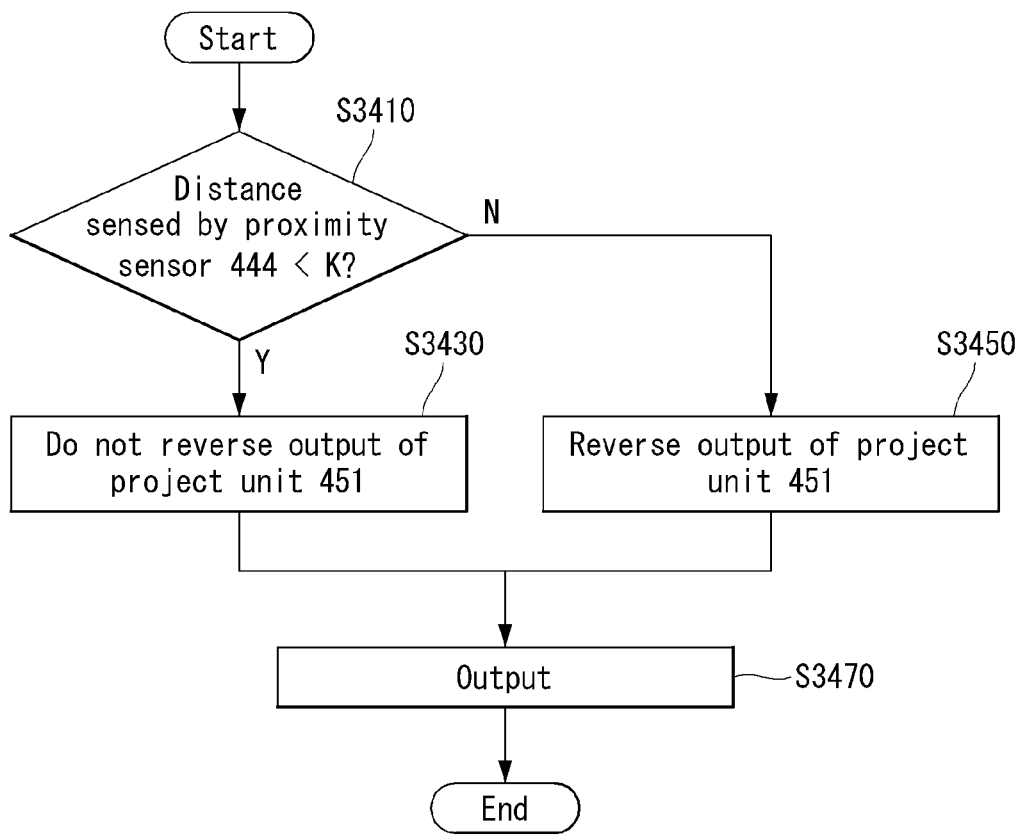

PROJECTOR

CROSS-REFERENCE TO RELATED APPLICATIONS

This application is the National Stage filing under 35 U.S.C. 371 of International Application No. PCT/KR2018/005982, filed on May 25, 2018, which claims the benefit of earlier filing date and right of priority to Korean Application No. 10-2018-0018088, filed on Feb. 13, 2018, the contents of which are all incorporated by reference herein in their entirety.

TECHNICAL FIELD

The present disclosure relates to a projector.

Background Art

A projector is a device for enlarging an image and displaying the enlarged image on a projection screen or a white flat surface similar thereto. The projector can be used to provide the same information to a large audience.

Recently, technology with respect to small projectors for projecting images or screens stored in portable devices to the outside has been developed.

A lamp emitting white light, an LED light source or laser diodes may be used as a light source of a projector.

DISCLOSURE

Technical Problem

An object of the present disclosure is to provide a projector which reverses an image depending on an angle formed by a cover including a mirror and a body.

Another object is to provide a projector which outputs an rectangular image even when a reflection angle of a mirror changes.

Another object is to provide a projector in which a mirror assembly is combined with or separated from a cover depending on an angle formed by the cover and a body.

Technical Solution

To accomplish the objects, a projector according to an embodiment of the present disclosure may include: a body having an upper surfaces; a light output unit provided inside the body and outputting an image toward the upper surface; a cover covering the upper surface and pivotally connected to the body; and a controller for reversing the image depending on an angle formed by the cover and the upper surface.

The cover may include a first side connected to the body and a second side facing the first side, and the projector may include a mirror assembly facing the second side, including a rotation axis adjacent to the second side and connected to the cover.

The mirror assembly may face the light output unit.

The cover may include a magnet connected to the lower surface of the cover, and the mirror assembly may include a metal member connected to the upper surface of the mirror assembly and corresponding to the magnet.

The mirror assembly may have a side facing the rotation axis, and the side may become far away from or approach the cover according to rotation of the mirror assembly.

The mirror assembly may reflect an image output from the light output unit.

The mirror assembly may include a spring connected to the rotation axis, and the spring may provide a restoring force to the rotation axis such that the side approaches the cover when the side has become far away from the cover.

The body may include a protrusion adjacent to the first side and having a curved surface, and the cover may include: a third side connecting the first side and the second side; a lever extending along the third side, neighboring the third side and performing a seesaw motion; a slider protruding from the lever, neighboring the first side and coming into contact with or separated from the curved surface; and a push rod extending from the lever, neighboring the second side and positioned between the cover and the mirror assembly.

The slider may move up and the push rod may move down as the slider moves long the curved surface.

An angle formed by the mirror assembly and the cover may increase when the push rod moves down.

The mirror assembly may include a groove formed on the upper surface, and the push rod may be accommodated in the groove.

The mirror assembly may come into contact with the upper surface of the body.

The projector may include an elastic part extending from the lever and neighboring the slider.

The elastic part may provide a restoring force to the lever such that the lever moves down the slider when the slider moves up.

The lever may be positioned on one side of the mirror assembly.

Advantageous Effects

The effects of the projector according to the present disclosure will be described as follows.

According to at least one embodiment of the present disclosure, it is possible to reverse an image depending on the angle formed by the cover including the mirror and the body.

According to at least one embodiment of the present disclosure, it is possible to output an rectangular image even when a reflection angle of the mirror changes.

According to at least one embodiment of the present disclosure, the mirror assembly can be combined with or separated from the cover depending on the angle formed by the cover and the body.

The additional range of applicability of the present disclosure will become clear from detailed description below. However, those skilled in the art will appreciate that various modifications and variations can be made without departing from the spirit or scope of the present disclosure, and thus the detailed description and a specific embodiment such as a preferred embodiment of the present disclosure should be construed as illustrative.

DESCRIPTION OF DRAWINGS

FIGS. 1 to 22 are diagrams illustrating an example of a projector according to an embodiment of the present disclosure.

FIG. 23 is a diagram showing a configuration of the projector according to an embodiment of the present disclosure.

FIGS. 24 to 34 are diagrams showing an embodiment of controlling the projector according to an embodiment of the present invention.

MODE FOR INVENTION

In the following description, identical or similar elements are assigned the same reference numbers, and duplicate descriptions for the same reference numbers can be omitted.

In the following description, even if the embodiments are described with reference to specific drawings, reference numerals that do not appear in the specific drawings may be referred to when necessary, and reference numbers that do not appear in the specific drawings may have the reference numbers in the remaining drawings. Use only when indicated.

Terms such as first, second, A, B, (a), (b), upper side, lower side, and the like used in the following description can be used. These terms are only for distinguishing the component from other components, and the nature, order, or order of the component is not limited by the term.

Suffixes "module" and "unit" for components used in the following description are given or mixed in consideration of easy preparation of the specification only and do not have their own distinguished meanings or roles.

In the following description, when the first component is described as being "connected", "coupled", "mounted", "fastened", "contact" or "connected" to the second component, the first component is the second component as well as including "connecting", "joining", "mounting", "fastening", "contacting" or "connecting" directly to the element, the third component is between the first component and the second component It may also include cases of "connected", "coupled", "mounted", "fastened", "contact" or "connected".

In the following description, when it is determined that a detailed description of a known technology can obscure the gist of an embodiment of the present invention, a detailed description of the known technology can be omitted.

Further, it is to be understood that the accompanying drawings are just used for easily understanding the embodiments disclosed in the present disclosure and a technical spirit disclosed in the present disclosure is not limited by the accompanying drawings and all changes, equivalents, or substitutes included in the spirit and the technical scope of the present disclosure are included.

Terms such as height, length, width, and width used in the following description may be mixed for convenience of description, and do not have meanings or roles distinguished from each other.

Referring to FIG. 1, a direction parallel to the length of a projector 300 may be referred to as a first direction DR1, +x-axis direction, −x-axis direction, a left direction or a right direction. The +x-axis direction may be the right direction. The −x-axis direction may be the left direction. A direction parallel to the width of the projector 300 may be referred to as a third direction DR3, +z-axis direction, −z-axis direction, a forward direction or a backward direction. The +z-axis direction may be a front or forward direction. The −z-axis direction may be a rear or backward direction. A direction parallel to the height of the projector 300 may be referred to as a second direction DR2, +y-axis direction, −y-axis direction, an upward direction or a downward direction. The +y-axis direction may be the upward direction. The −y-axis direction may be the downward direction. The third direction DR3 may be perpendicular to the first direction DR1 and/or the second direction DR2. The first direction DR1 and the second direction DR2 may be collectively referred to as a horizontal direction. The third direction DR3 may be referred to as a vertical direction. A left-to-right direction LR may be parallel to the first direction DR1 and an up-and-down direction UD may be parallel to the second direction. The projector 300 may include a body 200 and a cover 100. The body 200 may also be called a main body 200, a main assembly 200 or an assembly 200. The cover 100 may also be called a sub-body 100, a body 100, a sub-assembly 100 or an assembly 100.

Referring to FIG. 2, a projector 300' may include a mirror 142'. The mirror 142' may be combined with a cover 100'. The mirror 142' may be integrated with the cover 100'. The angle formed by the cover 100' and the body 200' may be the same as the angle formed by the mirror 142' and the body 200'. The mirror 142' may reflect light projected from the body 200'.

Referring to FIG. 3, the body 200 may include a cover 210 and a housing 220. The cover 210 may be called a plate 210 or an upper plate 210. The housing 220 may provide an inside space. The cover 210 may cover the upper surface of the housing 220. The cover 210 may include holes 211 and 212. A project unit (451, refer to FIG. 18) inside the body 200 can output light and the light output from the project unit 451 can pass through the hole 211. Protrusions 213 and 214 may be adjacent to the hole 212. The protrusions 213 and 214 may be called cams 213 and 214. The protrusions 213 and 214 may have a curved surface CS.

Referring to FIG. 4, the cover 100 may include an outer cover 110 and a hinge 120. The outer cover 110 may be called a cover 110, a housing 110 or a plate 110. The hinger 120 may be called a hinge assembly 120.

Referring to FIG. 5, the cover 100 may include the outer cover 110, a body 130, a mirror assembly 140 and the hinge 120. The body 130 may be called a cover 130. The mirror assembly 140 may be called a mirror 140. The body 130 may be combined with the hinge 120 and the outer cover 110. The mirror assembly 140 may include a mirror 142 and a body 141. The cover 100 may include shock-absorbing members 131a, 131b and 131c. The shock-absorbing members 131a, 131b and 131c can absorb shock when the cover 100 covers the body 200.

Referring to FIG. 6, the mirror 142' and 142 may form an angle α with the body 200' and 200. Referring to (a) of FIG. 6, the cover 100' may have a length L1. When the angle α is formed by the cover 100' and the body 200', the mirror 142' may not reflect all of light projected from the body 200'. If the mirror 142' is extended by a length L2, the mirror 142' can reflect all of light projected from the body 200'. Here, a minimum length of the mirror 142' for reflecting all of light projected from the body 200' may be L4. Referring to (b) of FIG. 6, the cover 100 may have the length L1. When the angle α is formed by the cover 100 and the mirror assembly 140, an angle β may be formed by the cover 100 and the body 200. The angle β may be less than the angle α. When the angle α is formed by the cover 100 and the mirror 142, the mirror 142 can reflect all of light projected from the body 200. Here, a minimum length of the mirror 142 for reflecting all of light projected from the body 200 may be L3. In comparison between (a) of FIG. 6 and (b) of FIG. 6, the length L3 may be less than the length L4. That is, when the mirror 142' is integrated with the cover 100', the length of the cover 100' or the mirror 142' may increase as compared to a case where the mirror 142 rotates with respect to the cover 100. As in the case of (b) of FIG. 6, the size of the projector 300 can be reduced when the mirror 142 rotates with respect to the cover 100.

Referring to FIG. 7, the cover 100 can rotate on the hinge 120. When the cover 100 is open, the cover 210 can be exposed to the outside. When the cover 100 is open, the mirror assembly 140 can be separated from the cover 100.

The mirror assembly 140 can come into contact with the cover 210. Light emitted from the project unit 451 can pass through the hole 211 and then be reflected by the mirror 142.

Referring to FIG. 8, the cover 100 may be open wider than in the case of FIG. 7. Light emitted from the project unit 451 may be emitted to the outside without being reflected by the mirror 142 after passing through the hole 211. Here, since the light emitted from the project unit 451 does not pass through the mirror 142, an reversed image can be output as compared to the case of FIG. 7. A controller (480, refer to FIG. 23) can reverse the output of the project unit 451 and light output from the project unit 451 may be an image in the forward direction as shown in FIG. 7.

Referring to FIG. 9, the projector 300 may be used in a space formed by walls WL1 and WL2 and a ceiling CE. The projector 300 can project an image IW1 to the wall WL1. The height of the image IW1 from the floor may be a height at which a user 600 looks straight ahead. The wall WL1 may be a screen.

Referring to FIG. 10, the angle formed by the cover 100 and the body 200 of the projector 300 may increase as compared to the case of FIG. 9. The projector 300 can project an image IW2 higher than in the case of FIG. 9. The image IW2 may be positioned adjacent to the boundary between the wall WL1 and the ceiling CE. Here, the user 600 may gaze upward. For example, the user 600 may lean back in a chair 610 and gaze upward.

Referring to FIG. 11, the angle formed by the cover 100 and the body 200 of the projector 300 may increase as compared to the case of FIG. 10. For example, the angle formed by the cover 100 and the body 200 may be 90°. The projector 300 may project an image IC to the ceiling CE. Here, the user 600 can look at the ceiling CE. For example, the user 600 can lie on the floor and look at the ceiling CE. The image IC may not be reversed from the image IW1 and IW2. The image IC projected to the ceiling CE may be the images IW1 and IW2 that have moved to the ceiling CE along the wall W1.

Referring to FIG. 12, the hinge 120 may include a shaft 122 and connecting parts 121 and 123. The connecting part 121 can be fastened to the body 200. The connecting part 123 can be formed on the shaft 122. When the shaft 122 rotates, the connecting part 121 may not rotate.

Referring to FIG. 13, the cover 124 can be combined with the shaft 122. The cover 124 can be fastened to the shaft 122 and rotate with the shaft 122. The cover 124 may be positioned between the connecting parts 121. The cover 124 can cover the shaft 122 such that the shaft 122 is not exposed. The cover 124 may not cover the connecting part 123.

Referring to FIG. 14, the body 130 can be connected to the hinge 120. A screw S1 can penetrate a connecting member 134 and can be combined with the connecting part 123. A screw S2 can penetrate a connecting member 134 and can be combined with the body 130. The body may have a rectangular shape and include an opening 131. The opening 131 may have a rectangular shape. The connecting parts 132 and 133 may be formed on both sides of the opening 131. The body 130 may include a recess 135. The connecting member 134 may be positioned at the recess 135.

Referring to FIG. 15, the mirror assembly 140 may have a shaft 147. The shaft 147 may be a rotation axis A1. A key 144 can be combined with the shaft 147. The key 144 can rotate with the shaft 147. A spring 145 can be combined with the shaft 147. The mirror assembly 140 can be provided with a restoring force in a fourth direction DR4 due to the spring 145. The fourth direction DR4 may be a rotating direction with respect to the rotating axis A1. The stopper 146 can be fastened to the body 130. The stopper 146 can limit the rotation range of the key 144. The stopper 146 can fix the mirror assembly 140 to the body 130. The stopper 146 may not obstruct rotation of the mirror assembly 140. A groove 148 may be formed on the upper surface of the mirror assembly 140. A connecting member 143 can be fastened to the upper surface of the mirror assembly 140. The connecting member 143 may be a metal member or a magnetic body.

Referring to FIG. 16, a link 150 may have a rectangular shape. The link 150 may include an opening 150*b*. The opening 150*b* may have a rectangular shape. First parts 151*a* and 151*b*, second parts 152*a* and 152*b*, third parts 153*a* and 153*b*, fourth parts 154*a* and 154*b*, and a fifth part 155 can form the edge of the link 150. An elastic part 156 can be connected to the first parts 151*a* and 151*b*. The elastic part 156 can face the fifth part 155. The fifth part 155 may be called a push rod 155. The link 150 may include a hole 150*a* between the first parts 151*a* and 151*b*. Protrusions 157*a* and 157*b* may protrude downward from the first parts 151*a* and 151*b*. The protrusion 157*a* may be called a slider 157*a* or a slide 157*a*. The third parts 153*a* and 153*b* may include holes 158*a* and 158*b* through which the third parts 153*a* and 153*b* are fastened to the body 130. The third parts 153*a* and 153*b* may be the center of rotation of the link 150. The first parts 151*a* and 151*b*, the second parts 152*a* and 152*b*, and the third parts 153*a* and 153*b* may be collectively referred to as levers 151*a*, 152*a* and 153*a*/151*b*, 152*b* and 153*b*. The levers 151*a*, 152*a* and 153*a*/151*b*, 152*b* and 153*b* can perform a seesaw motion. The first parts 151*a* and 151*b* and the second parts 152 and 152*b* can perform a seesaw motion on the basis of the third parts 153*a* and 153*b*.

Referring to FIG. 17, a screw S can penetrate connecting members 159*a* and 159*b* and can be fastened to the connecting parts 132 and 133. The link 150 can rotate on the third parts 153*a* and 153*b*. The link 150 can be fixed to or fastened to the body 130 using the screw S and the connecting members 159*a* and 159*b*. The screw S and the connecting members 159*a* and 159*b* can limit the rotation range of the link 150. The fifth part 155 can be mounted on the groove 148. The connecting member 134 and the recess 135 can be positioned in the hole 150*a*. The connecting member 134 and the recess 135 may be positioned between the first parts 151*a* and 151*b*. A part of the mirror assembly 140 may be positioned in the opening 150*b*. A cover 160 can be fastened to the body 130. The cover 160 may also be called an outer cover 160. The cover 160 can cover surfaces of the body 130 other than the lower surface of the body 130.

Referring to FIG. 18, the protrusions 213 and 157*a* can correspond to each other. The protrusions 213 and 157*a* can come into contact with or be separated from each other depending on the angle formed by the cover 100 and the body 200. The protrusion 157*a* can slide along a curved surface CS. The elastic part 156 can come into contact with the cover 160. The elastic part 156 can provide a restoring force to the link 150 in the direction of the −y axis. The cover 160 may include a connecting member 161 on the inner side thereof. The connecting member 161 may be a metal member or a magnetic body. The connecting members 161 and 143 can be connected to each other by a magnetic force. The mirror assembly 140 can be combined with the cover 160 by means of the connecting members 161 and 143. The key 144 may include a protrusion 144*a*. The protrusion 144*a* can be caught by the stopper 146. The stopper 146 can limit the rotation range of the key 144.

Referring to FIG. 19, an angle θ1 can be formed by the cover 100 and the body 200. The mirror assembly 140 may not be separated from the cover 160. The angle θ1 may be equal to or greater than 0°. The mirror 142 forms an angle θA with the body 200. The angle θ1 and the angle θA may be the same value. The protrusions 213 and 157a may come into contact with or be separated from each other.

Referring to FIG. 20, an angle θ2 can be formed by the cover 100 and the body 200. The mirror assembly 140 can be separated from the cover 160. The angle θ2 may be equal to or greater than 0°. The protrusion 213 can push up the protrusion 157a. When the protrusion 157a rises, the link 150 can rotate on the third parts 153a and 153b. The elastic part can provide a restoring force to the link. The fifth part 155 can push down the mirror assembly 140 and can be separated from the groove 148. The mirror assembly 140 can rotate according to the weight thereof. The mirror assembly 140 can come into contact with the cover 210 and stop rotation according to the cover 210. The mirror assembly 140 can slowly rotate according to a restoring force provided by the spring 145. An angle θB can be formed by the mirror 142 and the body 200. The angle θB may be greater than the angle θ2. The angle θB may be greater than the angle θA.

Referring to FIG. 21, an angle θ3 can be formed by the cover 100 and the body 200. The mirror assembly 140 can be separated from the cover 140. The angle θ3 may be greater than the angle θ2. The protrusions 213 and 157a can be separated from each other. The elastic part 156 can provide a restoring force to the link 150. The link 150 can rotate according to the restoring force. The fifth part 155 can move such that it comes into contact with or approaches the cover 160. The mirror assembly 140 can rotate according to the weight thereof. The mirror assembly 140 can come into contact with the cover 210 and stop rotation according to the cover 210. The mirror assembly 140 can slowly rotate according to the restoring force provided by the spring 145. An angle θC can be formed by the mirror 142 and the body 200. The angle θ may be greater than the angle θ3. The angle θC may be greater than the angle θB.

Referring to FIG. 22, an angle θ4 can be formed by the cover 100 and the body 200. The mirror assembly 140 can rotate according to the weight thereof and approach the cover 160. When the mirror assembly 140 approaches the cover 160, the connecting members 161 and 143 can be connected to each other by a magnetic force. The mirror assembly 140 can be combined with the cover 160 by means of the connecting members 161 and 143. The protrusions 213 and 157a can be separated from each other. The fifth part 155 can be mounted on the groove 148. The angle θ4 may be greater than the angle θ3. The mirror assembly 140 can slowly rotate according to the restoring force provided by the spring 145. An angle θD can be formed by the mirror 142 and the body 200. The angle θD may be the same as the angle θ4. The angle θD may be greater than the angle θC.

When the angle formed by the cover 100 and the body 200 is 0°, the cover 100 can completely cover the body 200. As the angle formed by the cover 100 and the body 200 increases, the cam 213 and the slider 157a can come into contact with each other and the cam 213 can lift the slider 157a. When the cam 213 lifts the slider 157a, the mirror assembly 140 can be separated from the cover 100. As the angle formed by the cover 100 and the body 200 becomes close to 90°, the cam 213 can be separated from the slider 157a. As the angle formed by the cover 100 and the body 200 becomes close to 90°, the mirror assembly 140 can gradually approach the cover 100 according to the weight thereof to be combined with the cover 100 again. Then, as the angle formed by the cover 100 and the body 200 gradually decreases, the cam 213 can come into contact with the slider 157a and lift the slider 157a. When the cam 213 lifts the slider 157a, the mirror assembly 140 can be separated from the cover 100. The angle formed by the cover 100 and the body 200 becomes 0°, the mirror assembly 140 can be combined with the cover 100.

Referring to FIG. 23, the projector 300 may include a communication unit 410, an input unit 420, a sensing unit 440, an output unit 450, an interface unit 460, a memory 470, a controller 480, and a power supply unit 490. The components illustrated in FIG. 23 are not essential for realizing the projector 300 and the projector 300 may have more components or fewer components than the aforementioned components.

The communication unit 410 may include one or more modules that allow communication between the projector 300 and a communication system, between the projector 300 and other projectors, or between the projector 300 and an external server. Further, the communication unit 410 may include one or more modules that connect the projector 300 to one or more networks. The communication unit 410 may include at least one of a wireless Internet module 413 and a short-range communication module 414.

The input unit 420 may include a user input unit for receiving information from a user. Audio data or image data collected by the input unit 420 may be analyzed and processed into a control command of a user. The user input unit may generate input data according to a command input from a user. The user input unit may include a key pad, a dome switch, a touch pad, a jog wheel, a jog switch, etc.

The sensing unit 440 may include one or more sensors for sensing at least one of information on the surrounding environment of the projector 300 and user information. The sensing unit 440 may include an angular sensor 442 (angular rate sensor or angle sensor) for sensing a rotation angle. The angular sensor 442 may be a sensor that measures the amount of reflected light using a mirror, a polarization type sensor that measures the amount of light using a polarizer, an electrostatic angle sensor, or a displacement sensor that senses rotational displacement. The sensing unit 440 may include a displacement sensor 441 (position sensor or distance sensor). The sensing unit 440 may include a photosensor 443 (photodetector). The photosensor 443 may also be called a photodetector 443. The sensing unit 440 may include a proximity sensor 444. Meanwhile, the projector 300 disclosed in the present specification can combine and use information sensed by at least two of the aforementioned sensors.

The output unit 450 generates output with respect to sense of sight, sense of hearing or sense of touch and may include at least one of a project unit 451, an audio output module 452 and an optical output module 454. The project unit 451 can output light. The project unit 451 may also be called a light output unit. Light output from the project unit 451 can be focused on a screen to form an image. Light output from the project unit 451 may be directly projected to a screen or reflected by the mirror 142 and then projected to the screen. The audio output module 452 can output information about an operating state of the projector 300 as sound. The optical output module 454 can output information about an operating state of the projector 300 as light. For example, when the projector 300 is in a standby state in which the projector 300 does not operate while power is supplied thereto, the optical output module 454 may output blue light. When the projector 300 is operating, the optical output module 454 may output green light.

The interface unit 460 serves as a passage to various types of external devices connected to the projector 300. The interface unit 460 may include at least one of a wired/wireless headset port, an external charger port, a wired/wireless data port, a memory card port, a port for connecting a device including an identification module, an audio input/output (I/O) port, a video I/O port, and an earphone port. The projector 300 can perform appropriate control related to an external device connected thereto in response to connection of the external device to the interface unit 160. The interface unit 460 may be electrically or physically connected to an external device 500.

The memory 470 stores data supporting various functions of the projector 300. The memory 470 may store a lot of application programs (or applications) executed in the projector 300, data and commands for operation of the projector 300. At least some of the application programs may be downloaded from an external server through wireless communication. Further, at least some of such application programs may be installed in the projector 300 in the factory for fundamental functions of the projector 300. Meanwhile, application programs may be stored in the memory 470, installed in the projector 300 and executed to perform operations (or functions) of the projector 300.

The controller 480 controls overall operation of the projector 300 in addition to operations related to application programs. The controller 480 may process signals, data and information input or output through the aforementioned components or execute application programs stored in the memory 470 to provide appropriate information or functions to a user or process information. The controller 480 may control at least some of the components illustrated in FIG. 23 in order to execute an application program stored in the memory 470. Furthermore, the controller 480 may combine and operate at least two components included in the projector 300 in order to execute an application program.

The power supply unit 490 is provided with external power and internal power under the control of the controller 480 and supplies power to each component included in the projector 300. The power supply unit 490 may include a battery, and the battery may be an embedded battery or a separable battery.

At least some of the above-described components may operate in cooperation in order to realize operations, control or a control method of the projector 300 according to various embodiments which will be described below. In addition, the operation, control or control method of the projector 300 may be realized by executing at least one application program stored in the memory 470.

Referring to FIG. 24, an angle θ5 can be formed by the cover 100 and the body 200. An angle θE can be formed by the mirror 142 and the body 200. Light projected from the project unit 451 to the mirror 142 in parallel to the y axis may be reflected by the mirror 142 and may be parallel to the z axis. For example, the angle θE may be 45° and the angle θ5 may be 33.6°. The light reflected by the mirror 142 may be focused on a screen to form a rectangular or square image.

Referring to FIG. 25, an angle θ6 can be formed by the cover 100 and the body 200. An angle θF can be formed by the mirror 142 and the body 200. The angle θ6 may be greater than the angle θ5. The angle θF may be greater than the angle θE. Light projected from the project unit 451 to the mirror 142 in parallel to the y axis may be reflected by the mirror 142 and may not be parallel to the z axis. For example, the angle θF may be 53° and the angle θ6 may be 39°. The light reflected by the mirror 142 may be focused on a screen to form a quadrilateral image that is not a rectangle or a square. For example, the image formed on the screen may have a trapezoidal or parallelogram shape. An angle θ' may be an angle of projection. For example, the angle θ' may be 16°.

Referring to FIG. 26, the controller 480 can acquire an angle θ formed by the body 200 and the cover 100 (S1910). The angle θ may be sensed by the angular sensor 442. The controller 480 can compare the angle θ with an angle B and an angle C (S1930). The angle B and the angle C may be stored in the memory 470. The controller 480 can perform Keystone correction when the angle θ is greater than the angle B and less than the angle C (S1950). Keystone correction can refer to correcting distortion of a screen into a trapezoidal shape depending on a projection angle or projection distance into a square shape. When Keystone correction is performed, the memory 470 can store a correction amount depending on the angle θ. The controller 480 may not perform Keystone correction when the angle θ is less than the angle B or greater than the angle C (S1970). The project unit can output light (S1990).

Referring to FIG. 27, a first image I1 and a second image I2 may be images projected from the projector 300. The first image I1 may be an image distorted into a trapezoidal shape. The projector 300 can perform Keystone correction and the second image I2 may be a Keystone-corrected image. The second image I2 may have a rectangular shape.

Referring to FIG. 28, when the angle formed by the cover 100 and the body 200 is equal to or greater than an angle A, light output from the project unit 451 may not meet the cover 100. For example, when the light output from the project unit 451 does not meet the cover 100, the light may be projected to the ceiling. As compared to a case in which light output form the project unit 451 is reflected by the mirror 142, an image formed after the light output from the project unit 451 is reflected by the mirror may be the reverse of an image formed when the light output from the project unit 451 does not meet the mirror 142. Accordingly, when the angle formed by the cover 100 and the body 200 is equal to or greater than the angle A, the controller 480 can control the project unit 451 such that the project unit 451 projects a reversed output. Here, the angle A may be referred to as a critical angle. For example, the angle A may be about 78.4°.

Referring to FIG. 29, the controller 480 can acquire an angle θ formed by the body 200 and the cover 100 (S2310). The angle θ may be sensed by the angular sensor 442. The controller 480 can compare the angle θ with the angle A (S2330). The angle A may be stored in the memory 470. The controller 480 can control the project unit 451 such that the project unit 451 projects a reversed output when the angle θ is greater than the angle A (S2350). The controller 480 may not reverse the output of the project unit 451 when the angle θ is less than the angle A (S2370). The project unit can output light (S2390).

Referring to FIG. 30, the mirror assembly 140 may include a first photosensor 443a. A second photosensor 443b may be provided in the mirror assembly 140 or the cover 100. The first photosensor 443a may be provided on one side close to the protrusion 213. The second photosensor 443b may be provided in proximity to the rotation axis of the mirror assembly 140. The first photosensor 443a or the second photosensor 443b can sense light projected from the body 200. The first photosensor 443a may sense light and the second photosensor 443b may not sense light depending on the angle formed by the cover 100 and the body 200. When at least one of the first photosensor 443a and the second photo sensor 443b senses light, the mirror assembly 140 can reflect light projected form the body 200.

Referring to FIG. 31, the first photosensor 443a and the second photosensor 443b may not sense light depending on the angle formed by the cover 100 and the body 200. When the first photosensor 443a and the second photosensor 443b may not sense light, the mirror assembly 140 may not reflect light projected from the body 200 and the projector 300 can project light to the ceiling. The controller 480 can reverse the output of the project unit 451 and an image projected to the ceiling can be the reverse of the image output in FIG. 30.

Referring to FIG. 32, the controller 480 may determine whether the first photosensor 443a senses light (S3210). When the first photosensor 443a senses light, the controller 480 may not reverse the output of the project unit 451 (S3270). When the first photosensor 443a does not sense light, the controller 480 may determine whether the second photosensor 443b senses light (S3230). When the second photosensor 443b does not sense light, the controller 480 may not reverse the output of the project unit 451 (S3250). The project unit 451 can output light (S3290).

Referring to FIG. 33, the proximity sensor 444 may be provided in the body 200. The proximity sensor 444 can sense the cover 100. The proximity sensor 444 can sense the cover 100 when the distance from the proximity sensor 444 to the cover 100 is less than K. When the proximity sensor 444 senses the cover 100, the mirror assembly 140 may reflect light projected from the body 200. When the proximity sensor 444 does not sense the cover 100, the mirror assembly 140 may not reflect light projected from the body 200 and the projector 300 can reverse light output.

Referring to FIG. 34, the proximity sensor 444 can sense the distance from the proximity sensor 444 to the cover 100. The controller 480 may compare the distance sensed by the proximity sensor 444 with K (S3410). The value K may be stored in the memory 470. The controller 480 can control the project unit 451 such that the project unit 451 projects a reversed output when the sensed distance is equal to or greater than K (S3450). The controller 480 may not reverse the output of the project unit 451 when the sensed distance is less than K (S3430). The project unit 451 can output light (S3470).

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A projector comprising:
a body having an upper surface;
a light output device provided inside the body to output an image toward the upper surface;
a cover having a first side connected to the body and a second side facing the first side and a third side connecting the first side and the second side, and covering the upper surface and pivotally connected to the body;
a controller configured to reverse the image depending on an angle formed by the cover and the upper surface; and
a mirror assembly facing the second side of the cover, the mirror assembly including a rotation shaft adjacent to the second side and connected to the cover,
wherein the body includes a protrusion adjacent to the first side of the cover and having a curved surface,
wherein the cover includes:
a lever extending along the third side, neighboring the third side and configured to move in a seesaw motion;
a slider protruding from the lever, neighboring the first side and configured to come into contact with or be separated from the curved surface of the protrusion of the body; and
a push rod extending from the lever, neighboring the second side and positioned between the cover and the mirror assembly.

2. The projector of claim 1, wherein the mirror assembly faces the light output device.

3. The projector of claim 1, wherein the mirror assembly reflects the image output by the light output device.

4. The projector of claim 1, wherein the slider is raised and the push rod is lowered as the slider moves along the curved surface.

5. The projector of claim 4, wherein an angle formed by the mirror assembly and the cover increases when the push rod is lowered.

6. The projector of claim 4, wherein the mirror assembly is configured to come into contact with the upper surface of the body.

7. The projector of claim 1, wherein the mirror assembly has a groove formed on the upper surface, and the push rod is accommodated in the groove.

8. The projector of claim 1, further comprising an elastic member extending from the lever and neighboring the slider.

9. The projector of claim 8, wherein the elastic member is configured to provide a restoring force to the lever such that the lever moves down the slider when the slider is raised.

10. The projector of claim 1, wherein the lever is positioned on one side of the mirror assembly.

* * * * *